United States Patent
Ishii et al.

(10) Patent No.: US 10,077,807 B2
(45) Date of Patent: Sep. 18, 2018

(54) COMPOSITE PLAIN BEARING, CRADLE GUIDE, AND SLIDING NUT

(71) Applicant: NTN CORPORATION, Osaka (JP)

(72) Inventors: Takuya Ishii, Mie (JP); Masato Shimoda, Mie (JP); Yasushi Oohashi, Mie (JP); Satoru Fukuzawa, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/388,738

(22) PCT Filed: Feb. 8, 2013

(86) PCT No.: PCT/JP2013/053050
§ 371 (c)(1),
(2) Date: Sep. 26, 2014

(87) PCT Pub. No.: WO2013/145889
PCT Pub. Date: Oct. 3, 2013

(65) Prior Publication Data
US 2015/0204383 A1    Jul. 23, 2015

(30) Foreign Application Priority Data

Mar. 27, 2012 (JP) .................................. 2012-072391
May 25, 2012 (JP) .................................. 2012-119624
(Continued)

(51) Int. Cl.
*F16H 1/24* (2006.01)
*F16H 55/02* (2006.01)
(Continued)

(52) U.S. Cl.
CPC ............ *F16C 33/201* (2013.01); *F04B 1/141* (2013.01); *F04B 53/14* (2013.01); *F16C 17/02* (2013.01);
(Continued)

(58) Field of Classification Search
CPC ............... F16H 2025/249; F16H 25/24; F16C 2240/60; F16C 2208/36; F16C 33/201
See application file for complete search history.

(56) References Cited

U.S. PATENT DOCUMENTS 3,081,644 A * 3/1963 Hudgens ................. F16H 25/24
264/242
3,643,522 A * 2/1972 Fullam ...................... B64C 9/02
74/467
(Continued)

FOREIGN PATENT DOCUMENTS

CN    101715392 A    5/2010
GB    929886 A    6/1963
(Continued)

OTHER PUBLICATIONS

English Abstract; JP2008 082235 A, dated Jan. 10, 2008.
(Continued)

*Primary Examiner* — William J Cook
(74) *Attorney, Agent, or Firm* — Hedman & Costigan, P.C.; James V. Costigan; Kathleen A. Costigan

(57) ABSTRACT

There is provided a composite plain bearing having excellent heat resistance, creep resistance under high surface pressure, low friction, abrasion resistance, and other characteristics while being capable of manufacture with high productivity. A composite plain bearing (1) comprising an ingot metal plate (2) and a resin layer (3) comprises a resin composition in which an aromatic polyether ketone resin or the like is used as a base resin, wherein the resin layer (3) is overlaid by injection molding and integrally provided on the surface on the surface of the ingot metal plate (2) to a thickness of 0.1 to 0.7 mm. The ingot metal plate (2) is chemically surface-treated on a face joined to the resin layer (3).

11 Claims, 17 Drawing Sheets

(30) Foreign Application Priority Data

Aug. 1, 2012 (JP) .................................. 2012-170820
Feb. 5, 2013 (JP) .................................. 2013-020766

(51) Int. Cl.
| | | |
|---|---|---|
| *F16C 33/20* | (2006.01) | |
| *F04B 1/14* | (2006.01) | |
| *F04B 53/14* | (2006.01) | |
| *F16C 17/02* | (2006.01) | |
| *F16H 25/24* | (2006.01) | |

(52) U.S. Cl.
CPC .......... *F16C 33/208* (2013.01); *F16H 25/24* (2013.01); *F05C 2253/20* (2013.01); *F16C 2208/36* (2013.01); *F16C 2240/60* (2013.01); *F16C 2360/42* (2013.01); *F16H 2025/249* (2013.01); *Y10T 74/1987* (2015.01)

(56) References Cited

U.S. PATENT DOCUMENTS

| | | | | |
|---|---|---|---|---|
| 3,698,257 | A * | 10/1972 | Ballentine | F16H 25/2009 74/409 |
| 4,134,842 | A | 1/1979 | Orkin et al. | |
| 4,592,782 | A | 6/1986 | Davies | |
| 4,811,618 | A * | 3/1989 | Takayama | F16H 25/22 411/438 |
| 5,879,791 | A | 3/1999 | Kato et al. | |
| 6,464,034 | B1 * | 10/2002 | Toda | B62D 5/0448 180/444 |
| 2008/0070707 | A1 * | 3/2008 | Yamamoto | H02K 7/06 464/182 |
| 2010/0098360 | A1 * | 4/2010 | Schmitjes | F16C 33/28 384/129 |

FOREIGN PATENT DOCUMENTS

| | | |
|---|---|---|
| JP | 59-058097 A | 4/1984 |
| JP | 01-56285 B2 | 11/1989 |
| JP | 08-210357 A | 8/1996 |
| JP | 08-334081 A | 12/1996 |
| JP | 09-151313 A | 6/1997 |
| JP | 09-157532 A | 6/1997 |
| JP | 2559510 Y2 | 9/1997 |
| JP | 2584135 Y2 | 8/1998 |
| JP | 2000-346164 A | 12/2000 |
| JP | 2001-227604 A | 8/2001 |
| JP | 2003-239932 A | 8/2003 |
| JP | 2004-025527 A | 1/2004 |
| JP | 2004-204989 A | 7/2004 |
| JP | 2004-277787 A | 10/2004 |
| JP | 2006-027018 A | 2/2006 |
| JP | 2006-138405 A | 6/2006 |
| JP | 2006-266102 A | 10/2006 |
| JP | 2007-331201 A | 12/2007 |
| JP | 2008-082235 A | 4/2008 |
| JP | 2008/106626 A | 5/2008 |
| JP | 2011-247408 A | 12/2011 |
| JP | 2012-077764 A | 4/2012 |
| WO | 03-064150 A1 | 8/2003 |
| WO | 2004-041532 A1 | 5/2004 |
| WO | 2005/116468 A1 | 12/2005 |

OTHER PUBLICATIONS

English Abstract; JP2012-077764 A, dated Apr. 19, 2012.
International Search Report in corresponding PCT application dated Apr. 2, 2013.
English Abstract for JP 2008/106626 A dated May 8, 2008.
Supplementary European Search Report dated Jan. 7, 2016.

\* cited by examiner (a)

(b)

(a)

UNIT : mm
A=35, B=5, D=18, L=25
d=12, T=22, X=4.5
P.C.D.=26

(b)

B-B' CROSS SECTION    A-A' CROSS SECTION

UNIT : mm
FLANGE OUTSIDE DIAMETER = 55, FLANGE THICKNESS = 5
OUTSIDE DIAMETER = 37, ENTIRE LENGTH = 25
SHAFT OUTSIDE DIAMETER = 12, HOLE DIAMETER = 4.5
P.C.D. = 45

COMPOSITE PLAIN BEARING, CRADLE GUIDE, AND SLIDING NUT

TECHNICAL FIELD

The present invention relates to composite plain bearing, a cradle guide, and a sliding nut for a sliding screw device, which are members in which a resin layer has been thinly molded onto an ingot metal component or the like. In particular, the present invention relates to a member obtained by chemically surface-treating a face joined to the resin layer on the ingot metal component or the like. The present invention also relates to a sliding screw device in which there are used: a compressor that uses a composite plain bearing; a variable-capacity axial piston pump in which the cradle guide is used; and the sliding nut.

BACKGROUND ART

Progress is being made for substitutes for a compressor in a room air conditioner, a car air conditioner, and the like, for a bearing of a transmission rotating shaft in an automobile, construction machinery, and the like, and metal rolling bearings in a thrust bearing.

Various proposals as substitutes for the sliding of a metal rolling bearing include not only resin materials, but also sintered materials. However, load-bearing capacity and heat resistance are not sufficient in resin materials alone, and sintered materials have a seizing problem when oil is depleted. As a countermeasure thereto, there has been proposed a multilayered bearing in which copper-based sintered layer is disposed on the surface of a steel plate and a resin material is impregnated in the sintered layer, and also known is a polytetrafluoroethylene (hereinafter notated as PTFE) resin composition blended with various fillers and coated as a sliding face of the multilayered bearing. However, PTFE resin has poor creep resistance and load-bearing capacity is insufficient.

Also known are multilayered bearings coated with polyether ether ketone (hereinafter notated as PEEK) resin, polyamide resin, liquid crystal polymer, and the like, in lieu of PTFE resin. For example, a plain bearing has been proposed in which an intermediate layer of bronze is sintered onto a metal base, a lining material layer is applied to the sintered product, heat and pressure are applied to the lining, the intermediate layer, and the base, and the lining is a substance having a composition comprising a mixture of 60 to 90 wt % PEEK resin, 15 to 3.7 wt % PTFE resin, 5 to 1.3 wt % graphite, and 20 to 5 wt % bronze (see patent document 1). Also proposed is a wet-type multilayered sliding member composed of a surface lay essentially comprising a backing metal layer, a porous sintered layer disposed on the backing metal layer, and a PEEK resin impregnated in and coated on the porous sintered layer (see patent document 2). Additionally, there is also proposed a sliding member for wet-type thrust bearing composed of 10 to 45 wt % carbon fiber, 0.1 to 8.5 wt % PTFE resin, and the remainder essentially being a PEEK resin or polyphenylene sulfide (hereinafter notated as PPS) resin in a porous sintered layer with a backing metal (patent document 3).

Also, the compressor has a rotating member for driving the compression mechanism, and this rotating member is supported by a bearing. The plain bearing for supporting the rotating member for driving the compression mechanism is required to have precise rotation accuracy, to have excellent load-bearing capacity and creep resistance in order to stably obtain low rotational torque, to have no dimensional change under high pressure, and to have other advantageous properties. Examples of a plain bearing used in the same application include the sliding member of patent document 2.

The structure of a so-called cradle-type pump (may hereinafter be referred to merely as "pump") is well known as a variable-capacity piston pump used in a hydraulic pressure generator for a hydraulic circuit. In a cradle-type pump, a cylinder block for accommodating a piston is integrally rotated together with a rotating shaft, and the cradle makes sliding contact with a cradle guide and is supported so as to allow sloping with respect to the rotating shaft and is in contact with the sloped surface of the cradle via a shoe coupled to the end part of the piston. Therefore, the piston reciprocates with a stroke provided in accordance with the slope of the cradle in accompaniment with the rotation of the rotating shaft, and is made to demonstrate a pumping effect. The discharge capacity of the pump determined by the stroke difference can be constantly modified by controlling the slope angle of the cradle in relation to the rotating shaft by using hydraulic pressure or the like.

However, when a cradle composed of, e.g., an aluminum material (including aluminum alloys) is brought into sliding contact and held in a cradle guide composed of the same aluminum material, the two components create sliding-contact friction when used for constantly controlling the slope angle of the cradle in relation to the rotating shaft using hydraulic pressure or the like, resulting in seizing or other problems. For this reason, a means has been adopted in which a thrust bushing made of synthetic resin is interposed between the cradle and cradle guide.

Well-known examples of a thrust bushing serving as a cradle guide include metal thrust bushings in which a resin film has been applied to the sliding surface, and a thrust bushing composed of nylon (polyamide resin), polyacetal resin, PTFE resin, and other sliding resins (see patent document 4).

Also known are variable-capacity piston pumps in which the cradle and/or cradle guide composed of an aluminum material is coated with an ethylene tetrafluoroethylene copolymer (ETFE) resin, a tetrafluoroethylene-hexafluoropropylene copolymer (FEP) resin, a PTFE resin, or another fluororesin (see patent document 5).

A thrust bushing in which a sintered copper film is formed on the surface of an iron base material, and a thrust busing in which a resin film is furthermore formed on the surface of the sintered film are also known as thrust bushings that serve as a cradle guide (see patent document 6).

A sliding screw device for converting rotational motion into rectilinear motion has an advantage in what it can be compactly designed in comparison with a ball screw device, and is often used in feed devices for industrial machinery, positioning devices, and the like. In a sliding screw device that uses a nut made of a copper alloy or another metal, an increase in torque and seizing are concerns due to depletion of applied oil or grease, and periodic maintenance is therefore required. Also, such cannot be used in a vacuum, in water, or in other environments where oil or grease cannot be applied. In view of the above, sliding screw devices and the like that use a resin nut are being developed for making usage possible without lubrication, making the device maintenance free, and achieving other purposes.

There are examples of a nut made entirely of resin or a nut in which the groove portion of the threading as the sliding portion is made of resin. One such example is a resin nut in which the groove portion of the threading (or the entire nut) to be threaded onto a screw shaft is formed from a PPS resin composition in which PTFE resin and an organic resin powder that does not melt at 280° C. are blended with PPS resin (see patent document 7). Another proposal is a sliding screw device provided with a nut that moves in a relative manner while axially sliding on the screw shaft in accompaniment with the rotation of the screw shaft, the nut having a powder-coated film of an aromatic polyimide resin formed on at least the female threading part thereof (see patent document 8).

A proposed example of a nut composed of a metal portion and a resin portion is a flanged nut that is threaded onto a screw shaft and that moves in a relative manner in the axial direction with the screw shaft, the external peripheral portion including the flange being formed from metal, the internal peripheral portion that is threaded onto the screw shaft being formed from a lubricating resin, and means to detent and retain the nut being disposed between the external peripheral portion and the internal peripheral portion (see patent document 9).

Additionally, there has been proposed a method for manufacturing a resin nut that uses a mold for injection molding provided with: a fixed mold having a molding surface for molding one end face of the resin nut or one end face and the vicinity thereof; a movable mold having a cavity for molding the remaining outside shape surface of the resin nut and capable of moving in the axial direction with respect to the fixed mold; and a core pin provided to the movable mold and in which helical grooves for molding threading grooves are formed in the outside diameter surface. A molten resin is filled into the mold and a resin nut is molded. The resin nut is thereafter removed by opening the metal mold and rotating the core pin (see patent document 10).

PRIOR ART DOCUMENT

Patent Document

Patent Document 1: Japanese Patent Publication (Kokoku) No. 1-56285
Patent Document 2: Japanese Laid-Open Patent Publication No. 8-210357
Patent Document 3: Japanese Laid-Open Patent Publication No. 9-157532
Patent Document 4: Japanese Utility Model Registration No. 2559510
Patent Document 5: Japanese Laid-Open Patent Publication No. 08-334081
Patent Document 6: Japanese Utility Model Registration No. 2584135
Patent Document 7: Japanese Laid-Open Patent Publication No. 2003-239932
Patent Document 8: Japanese Laid-Open Patent Publication No. 2004-204989
Patent Document 9: Japanese Laid-Open Patent Publication No. 2006-138405
Patent Document 10: Japanese Laid-Open Patent Publication No. 2004-25527

SUMMARY OF THE INVENTION

Problems to be Solved by the Invention

The multilayered bearing disclosed in patent documents 1 to 3 is obtained by impregnating and coating or by heat fusing using a hot-plate press a composition composed of a PEEK resin onto a porous sintered layer. PEEK resins and PPS resins are harder than PTFE resins at room temperature and room temperature impregnation in the same manner as PTFE resins is difficult. Also, PEEK and PPS resins do not sufficiently impregnate a porous sintered layer even when heated and baked, close adhesion to an ingot metal substrate is in sufficient, and the resin layer is liable to fall off during use as a bearing.

There are also methods for heating and fusing an injection-molded or extrusion-molded resin film (PEEK resin, PPS resin, and the like) onto a porous sintered layer using a hot plate press, a pressure roller in a heated atmosphere, or the like. However, it is difficult to apply a strong melting shearing force in a hot plate press or a pressure roller in a heated atmosphere. It is also difficult to apply pressure because a resin at or about melting point is molten. Furthermore, resin sometimes has difficulty entering the porous sintered layer due to temperature variability caused by the effect of the outside environment. Variability in fusion readily occurs due to such factors. In particular, a pressure roller under heating produces fusion variability due to linear pressure, and close adhesive strength against frictional shearing force is insufficient.

Even a pressure roller has inferior productivity in that the injection-molded or extrusion-molded resin film undergoes hot fusion as a post step. It is also difficult to control the thickness of the resin layer, variability in thickness occurs, and thickness finishing by machining is required. Also, a hot plate press entails batch production, and productivity is therefore very poor.

Ordinarily, when the cradle makes constant sliding contact with the cradle guide with a high surface pressure of about 30 MPa, there is a problem with the cradle guide (thrust bushing) described in patent document 4 in that load resistance ascribable to the resin film is unsatisfactory.

This problem related to load resistance in applications is improved by forming the PTFE resin described in patent document 5 or other fluororesin coating on the surface of an aluminum cradle guide, or by forming a fluororesin coating on the surface of an iron base material described in patent document 6 via a copper-based sintered film, but in such cases, abrasion resistance and low-friction characteristics are insufficient.

Also, when a film (coating) layer is formed on a steel plate, manufacturing costs are increased in that blowing, drying, baking, or the like is required, and machining or the like by lathe or polisher is required after formation.

The resin nut in patent document 7 can be used without lubrication, but the flange and other mounting parts or the tooth flank in the female threading part are liable to be destroyed at high loads of, e.g., 5 MPa or higher, and usage is difficult.

With the sliding screw device of patent document 8, the main unit is made of metal or ceramic, and the nut is therefore not destroyed even under a high load of 5 MPa or more. However, it is structurally difficult to have resin completely melt or produce a molten flow in the formation of a powdered coating film composed of an aromatic polyimide resin, and a compact resin film is not formed because it is difficult to apply high pressure in a high-temperature state. Accordingly, abrasion of the resin film is considerable when used under high loads, and it is possible that close adhesion (shearing adhesive strength) with the nut body will be insufficient. Also, it is not easy to uniformly form a resin powder coating film into female threading part with good precision.

In the flanged nut of patent document 9, the external peripheral part of the nut is made of metal and the internal peripheral part comprising the female threading part is made of a synthetic resin. Therefore, the mechanical strength of the tooth flank in the female threading part is therefore equivalent to the resin nut of patent document 7, the female threading part and the joining part between the metal and resin are liable to be destroyed during use at high loads of 5 MPa or greater.

The present invention was devised in order to solve such problems, and an object of the present invention is to provide a composite plain bearing having excellent heat resistance, creep resistance under high surface pressure, low friction, abrasion resistance, and other characteristics while being capable of manufacture with high productivity. Another object is to provide a cradle guide for a variable capacity axial piston pump capable of satisfying load resistance, abrasion resistance, as well as low-friction characteristics while being readily manufactured at low cost, and to provide a variable capacity axial piston pump in which the cradle guide is used. A further object is to provide a sliding nut for a sliding screw device and a sliding screw device having excellent seizing resistance, abrasion resistance, and other sliding characteristics even when the design surface pressure of the contact part of the thread ridge is 5 MPa or greater, or under high load conditions of 7 MPa or greater.

Means for Solving the Problem

The composite plain bearing of the present invention is a composite plain bearing comprising an ingot metal plate and a resin layer comprises a resin composition in which an aromatic polyether ketone (hereinafter notated as PEK) resin is used as a base resin, wherein the resin layer is overlaid by injection molding and integrally provided on the surface on the surface of the ingot metal plate to a thickness of 0.1 to 0.7 mm.

The composite plain bearing of the ingot metal plate is characterized in being chemically surface-treated on a face joined to the resin layer. Also, the chemical surface treatment is characterized in being (1) a treatment in which very small concavo-convex shapes are formed on the joining face, or (2) a treatment in which a joining film that chemically reacts with the resin layer is formed on the joining surface.

The composite plain bearing of the present invention is characterized in that the resin composition contains a fibrous filler, and the fibrous filler is oriented in the resin layer so that the lengthwise direction of the fibers intersects the rotational direction of the bearing at 45 to 90 degrees.

The composite plain bearing of the present invention is characterized in that the material of the ingot metal plate is iron, aluminum, an aluminum alloy, copper, or a copper alloy.

The composite plain bearing of the present invention is characterized in that the ingot metal plate has a hole formed through to the opposite surface so as to intersect at an angle of 45 to 90 degrees with respect to the face joined to the resin layer, and a physical securing part integrated with the resin layer is formed in the hole portion during injection molding.

The composite plain bearing of the present invention is characterized in that the resin composition contains 5 to 30 vol % of carbon fiber as the fibrous filler and 1 to 30 vol % of polytetrafluoroethylene resin with respect to the entire resin composition.

The composite plain bearing of the present invention is characterized in that the resin composition has a melt viscosity of 50 to 200 Pa·s at a resin temperature of 380° C. and a shear rate of 1000 s$^{-1}$.

The composite plain bearing of the present invention is characterized in that the composite plain bearing is provided with the resin layer on one or more side surfaces of the ingot metal plate as selected from the inside diameter side, the outside diameter side, and the end face side, the ingot metal plate being rounded in a cylindrical shape or a flanged cylindrical shape.

The composite plain bearing of the present invention is characterized in that the composite plain bearing rotatably supports a rotating member for driving a compression mechanism of a compressor.

The cradle guide for a variable capacity axial piston pump of the present invention is a cradle guide for making sliding contact with a cradle for adjusting a piston stroke in a variable capacity axial piston pump and slidably holding the cradle, comprising an ingot metal member and a resin layer comprises a resin composition in which an aromatic polyether ketone resin is used as a base resin, wherein the resin layer is overlaid by injection molding and integrally provided to a thickness of 0.1 to 0.7 mm to at least the surface of the ingot metal member that slidably contacts the cradle.

The cradle guide for a variable capacity axial piston pump of the present invention is characterized in that the ingot metal member is chemically surface-treated on a face joined to the resin layer.

The cradle guide for a variable capacity axial piston pump of the present invention is characterized in that the resin composition contains a fibrous filler, and the fibrous filler is oriented in the resin layer so that the lengthwise direction of the fibers intersects the sliding direction of the cradle guide at 45 to 90 degrees.

The cradle guide for a variable capacity axial piston pump of the present invention is characterized in that the cradle guide has a cradle guide main body, and the ingot metal member is a partial cylindrical member and is disposed on the cradle guide main body. Also, the cradle guide for a variable capacity axial piston pump of the present invention is characterized in that the ingot metal member has a sintered metal layer on a face joined to the resin layer.

The variable capacity axial piston pump of the present invention is characterized in being provided with the cradle guide of the present invention.

The sliding nut of the present invention is a sliding nut that moves in a relative fashion while axially sliding on a screw shaft in accompaniment with the rotation of the screw shaft in a sliding screw device, comprising the nut main body is composed of a sintered metal, and a resin layer of a resin composition in which a synthetic resin is used as a base resin is overlaid by injection molding as a threading groove part on the surface of a female threading part into which the screw shaft threadedly engages in the nut main body.

The sliding nut of the present invention is characterized in that the nut main body is chemically surface-treated on a face joined to the resin layer.

The sliding nut of the present invention is characterized in that the thickness of the resin layer is 0.1 to 1.5 mm.

The sliding nut of the present invention is characterized in that the synthetic resin is at least one synthetic resin selected from an aromatic PEK resin, a thermoplastic polyimide (hereinafter notated as PI) resin, and a PPS resin. Also, the sliding nut of the present invention is characterized in that the resin composition contains 10 to 30 vol % of polytetrafluoroethylene resin and 2 to 10 vol % of graphite with respect to the entire resin composition without including a fibrous filler.

The sliding nut of the present invention is characterized in that the thermal conductivity of the ingot metal of the nut main body is 50 W/(m·K) or more. Also, the sliding nut of the present invention is characterized in that the ingot metal of the nut main body is aluminum, an aluminum alloy, copper, or a copper alloy.

The sliding nut in another aspect of the present invention is a sliding nut that moves in a relative fashion while axially sliding on a screw shaft in accompaniment with the rotation of the screw shaft in a sliding screw device, comprising the nut main body comprises a sintered metal, and a resin layer of a resin composition in which a synthetic resin is used as a base resin is overlaid by injection molding as a threading groove part on the surface of a female threading part into which the screw shaft threadedly engages in the nut main body; and the nut main body is chemically surface-treated on a face joined to the resin layer.

The sliding screw device of the present invention is a sliding screw device provided with a screw shaft and a sliding nut that moves in a relative fashion while axially sliding on the screw shaft in accompaniment with the rotation of the screw shaft, the sliding screw device being characterized in that the sliding nut is the sliding nut of the present invention. Also, the sliding screw device of the present invention is characterized in that the inside diameter of the smallest part of the nut main body is less than the outside diameter of the largest part of the screw shaft.

Effect of the Invention

The composite plain bearing of the present invention comprising an ingot metal plate and a resin layer comprises a resin composition in which an aromatic PEK resin is used as a base resin, wherein the resin layer is overlaid by injection molding and integrally provided on the surface of the ingot metal plate. The composite plain bearing is therefore advantageous having excellent heat resistance, low-friction characteristics, and abrasion resistance. The resin layer is overlaid and integrally provided by injection molding to a thickness (thinness) of 0.1 to 0.7 mm to the surface of the ingot metal plate, and friction-induced heat therefore readily escapes from the friction surface to the ingot metal plate-side, heat is unlikely to accumulate, load resistance is high, and the amount of deformation is low even under high surface pressure. This configuration is advantageous in that the true area of contact on the friction surface is reduced, frictional force and friction-induced heat are reduced, abrasion is decreased, and temperature increase in the friction surface is inhibited. Furthermore, the resin layer is overlaid by injection molding and integrally provided on the surface of the ingot metal plate, i.e., the ingot metal plate is inserted into a mold and the resin layer formed by injection molding. Therefore, a roll compression step or a hot plate-pressing step are not required as in a conventional multilayered bearing having a resin layer composed of a PEEK resin, and manufacturing can be readily carried out with high productivity. Also, in the particular case that thickness finishing will not be carried out by machining, the sliding surface has high dimensional precision due to injection molding.

The ingot metal plate is subjected to a chemical surface treatment on the face joined to the resin layer, more specifically, a treatment for forming very small concavo-convex shapes or a treatment by which a joining film that chemically reacts with the resin layer. A composite plain bearing is therefore obtained in which the close-adhesive strength between the resin layer and the ingot metal plate is improved, heat from the resin layer is readily transmitted to the ingot metal plate, the resin layer is not peeled away due to frictional force in the rotational direction of the bearing, load resistance is high, and friction and abrasion characteristics are excellent even under high surface pressure.

Since the resin composition contains a fibrous filler, the heat resistance, abrasion resistance, load resistance, and creep resistance of the resin layer can be further enhanced. Furthermore, since the lengthwise direction of the fibers in the fibrous filler is oriented in the resin layer so as to intersect the rotational direction of the bearing at 45 to 90 degrees, the two ends of the fiber serve as edges, the opportunity for abrasively damaging a counterpart material is reduced, the friction coefficient during rotation of the bearing is reduced, and torque fluctuations of the bearing are stable at a low level. A composite plain bearing having a stable bearing torque and friction coefficient is thereby obtained.

Since the material of the ingot metal plate is iron, aluminum, aluminum alloy, copper, or copper alloy, it possible to ensure required thermal conductivity and load resistance in the ingot metal plate.

The ingot metal plate has a hole formed through to the opposite surface so as to intersect at an angle of 45 to 90 degrees with respect to the face joined to the resin layer, and a physical securing part integrated with the resin layer is formed in the hole portion during injection molding. Therefore, the fixing force of the resin layer with respect to the frictional force in the rotational direction of the bearing is dramatically improved the safety factor is increased.

The resin composition contains 5 to 30 vol % of carbon fiber as the fibrous filler and 1 to 30 vol % of PTFE resin with respect to the entire resin composition. Therefore, deformation and abrasion of the resin layer is low and resistance to oil and the like is high, even in high PV conditions.

The resin composition has a melt viscosity of 50 to 200 Pa·s at a resin temperature of 380° C. and a shear rate of 1000 s$^{-1}$. Therefore, thin insert molding at 0.1 to 0.7 mm can be smoothly carried out on the surface of the ingot metal plate.

The composite plain bearing is provided with the resin layer on one or more side surfaces selected from the inside diameter side, the outside diameter side, and the end face side of the ingot metal plate rounded in a cylindrical shape or a flanged cylindrical shape, and therefore has versatility for withstanding one or more radial and axial loads.

The composite plain bearing of the present invention has high dimensional precision, excellent heat resistance, low friction, abrasion resistance, load resistance, and creep resistance while being capable of manufacture with high productivity, is capable of stably obtaining low rotational torque, and can therefore be advantageously used as a plain bearing for rotatably supporting a rotating member for driving a compression mechanism in a compressor for a room air-conditioner or a car air-conditioner.

The cradle guide for a variable capacity piston pump of the present invention has an ingot metal member and a resin layer formed on at least the surface of the ingot metal member that slidably contacts the cradle, the resin layer being composed of a resin composition in which an aromatic PEK resin is used as a base resin, and is therefore advantageous in having excellent heat resistance, low friction, and abrasion resistance.

The resin layer is overlaid and integrally provided by injection molding to a thickness (thinness) of 0.1 to 0.7 mm, and therefor has excellent load resistance and creep resistance and can stably obtain low torque without dimensional change even under high surface pressure. In particular, since the layer is thin, friction-induced heat readily escapes from the friction surface to the ingot metal member side, heat is unlikely to accumulate, load resistance is high, and the amount of deformation is low even under high surface pressure. Accordingly, the true contact surface area of the friction surface is low, frictional force and friction-induced heat are reduced, abrasion is alleviated, and an increase in friction surface temperature can be inhibited. As a result of the above, the cradle guide is advantageous in satisfying load resistance, abrasion resistance, as well as low-friction characteristics and is capable of long-term service, even in a high-pressure sliding condition of 30 MPa.

Furthermore, the resin layer is overlaid on and integrally provided to the surface of the ingot metal member by injection molding, that is to say, the resin layer is formed by inserting an ingot metal member into a mold and performing injection molding. Therefore, a coating film is not required to be formed (blowing, drying, baking, or the like) on a steel plate in the manner of a convention cradle guide, machining or the like by lathe or polisher is not required, and a sliding surface (resin layer) can be obtained with high dimensional precision while being readily manufactured at low cost.

The ingot metal member is chemically surface-treated on the face joined to the resin layer. A cradle guide having high load resistance and excellent friction abrasion characteristics even under high surface pressure is thereby obtained in which very small concavo-convex shapes and/or a joining film that chemically reacts with the resin layer is formed on the joining face, close-adhesive strength between the resin layer and the ingot metal member is enhanced, heat from the resin layer is readily transmitted to the ingot metal member, and the resin layer does not peel away due to frictional force when sliding with the cradle.

Since the resin composition contains a fibrous filler, the heat resistance, abrasion resistance, load resistance, and creep resistance of the resin layer can be further improved. Furthermore, since the fibrous filler in the resin layer is oriented so that the lengthwise direction of the fibers intersects the sliding direction of the cradle guide at 45 to 90 degrees, the aggression of the edges of the two ends of the fibrous filler against the surface of the counterpart material can be reduced, and fluctuations in the sliding torque can be prevented.

In one aspect of the cradle guide of the present invention, the ingot metal member is made into a partial cylindrical member, whereby cost increase can be prevented in that a conventional article can be used as the cradle guide bearing, and the ingot metal member can be used so as to replace a conventional thrust bushing, and design modifications and the like are not required.

The variable capacity axial piston pump of the present invention is provided with the cradle guide of the present invention. Precise cradle slope control is possible, operation for precise hydraulic pressure control is thereby made possible, and a pump that functions with precision and has high reliability is obtained.

The sliding nut of the present invention has a nut main body composed of a sintered metal, and a resin layer having a resin composition in which a synthetic resin is used as a base resin is overlaid and formed by injection molding as the threading groove part on the surface of the female threading part for threadedly engaging the screw shaft in the nut main body. Therefore, the mechanical strength of the tooth flank in the female threading part and the mounting part with the nut flange and the like is high, and the sliding nut is not destroyed when the design surface pressure of the contact part of the thread ridge is 5 MPa or greater, or even at a high load of 7 MPa or greater. Also, the sliding nut is advantageous having excellent heat dissipation characteristics, the true contact surface area on the friction surface is low, frictional force and friction-induced heat are reduced, abrasion is reduced, and an increase in friction surface temperature can be inhibited.

In particular, the resin layer, which is the threading groove part, is obtained by applying pressure to a resin that has been melted and made to flow by injection molding so as to be overlaid and formed on the nut main body. The resin layer can therefore be formed as a compact resin film, and abrasion is low even when the resin layer is used under a high load. Also, the resin layer bites into the roughness of the ingot metal surface, whereby the joining surface area is increased and the close-adhesive strength between the resin layer and the nut main body is enhanced. Furthermore, there are no gaps in the joining face between the resin layer and the female threading part (ingot metal), and heat in the resin layer is readily transmitted to the nut main body.

The nut main body is subjected to a chemical surface treatment on the face joined to the resin layer, more specifically, a treatment in which a joining film for chemically reacting with the resin layer. Therefore, a sliding nut is obtained in which the close-adhesive strength between the resin layer and the nut main body is enhanced, heat in the resin layer is readily transmitted to the ingot metal nut main body, the resin layer does not peel away due to frictional force with the screw shaft, load resistance is high, and frictional abrasion characteristics are excellent even with a high load.

The resin layer is a thin layer having a thickness of 0.1 to 1.5 mm. Therefore, friction-induced heat readily escapes from the friction surface to the nut main body, heat is not liable to accumulate, load resistance is high, and the amount of deformation is low even under high surface pressure.

The base resin of the resin composition for forming the resin layer is at least one synthetic resin selected from an aromatic PEK resin, a thermoplastic PI resin, and a PPS resin, and therefore has excellent load resistance, heat resistance, low-friction characteristics, and abrasion resistance characteristics.

Not including a fibrous filler in the resin composition avoids a problem in which the end part of fibers act as edges and cause abrasive damage to the counterpart screw shaft when the sliding nut moves back and forth in a relative fashion while axially sliding on the screw shaft in accompaniment with the rotation of the screw shaft, and the coefficient of friction is stable at a low value. Also, abrasion resistance is excellent even under a high load in that a problem is avoided in which the end parts of the fibers are repeatedly placed under stress when the sliding nut moves back and forth, and the resin undergoes fatigue abrasion.

Including a PTFE resin in the resin composition results in a low coefficient of friction, friction-induced heat is reduced, and a sliding nut having excellent friction and abrasion characteristics even under high load is obtained. Also, the sliding nut can be used without lubrication. In particular, when the resin composition contains 10 to 30 vol % PTFE and 2 to 10 vol % graphite with respect to the entire resin composition without including a fibrous filler, deformation and abrasion of the resin layer is kept low even under a high load, damage to a counterpart material is low, the resin composition can be used without a lubricant, and resistance to oil, grease, and the like is enhanced. Frictional heat is also readily dissipated because graphite has high thermal conductivity.

The thermal conductivity of the ingot metal of the nut main body is 50 W/(m·K) or greater, and heat from the resin layer is therefore readily transmitted from the ingot metal nut main body to the exterior, the true contact surface area on the friction surface is furthermore reduced, frictional force and abrasion are reduced, and an increase in friction surface temperature can be inhibited. The material of the ingot metal of the nut main body is aluminum, an aluminum alloy, copper, or a copper alloy, and required mechanical strength, thermal conductivity, and load resistance can be ensured.

In another aspect of the sliding nut, the nut main body is made of a sintered metal, whereby the resin layer and the nut main body can be endowed with firm close adhesion in conjunction with the chemical surface treatments described above. This is due to the fact that resin layer deeply bites into pores in the sintered metal surface (concavities and convexities in the surface) and the very small concavo-convex shapes produced by and chemical surface treatment, the true joining surface area is increased, as well as other factors.

The sliding screw device of the present invention is provided with a screw shaft and the sliding nut of the present invention for moving in a relative fashion while axially sliding on the screw shaft in accompaniment with the rotation of the screw shaft, and therefore has excellent seizing resistance, abrasion resistance, and other sliding characteristics at 5 MPa, or even in high load conditions 7 MPa or greater. Also, in the sliding screw device, the inside diameter of the smallest part of the nut main body (the convex part to the nut inside diameter) is less than the outside diameter of the largest part (the convex part to the shaft outside diameter) of the screw shaft. Therefore, safety during service can be enhanced in that the tooth flank in the female threading part of the nut does not break and become dislodged from the screw shaft, even under a high load unforeseen in an impact load or the like.

MODE FOR CARRYING OUT THE INVENTION

The composite plain bearing and compressor of the present invention are described below.

Figure 1:
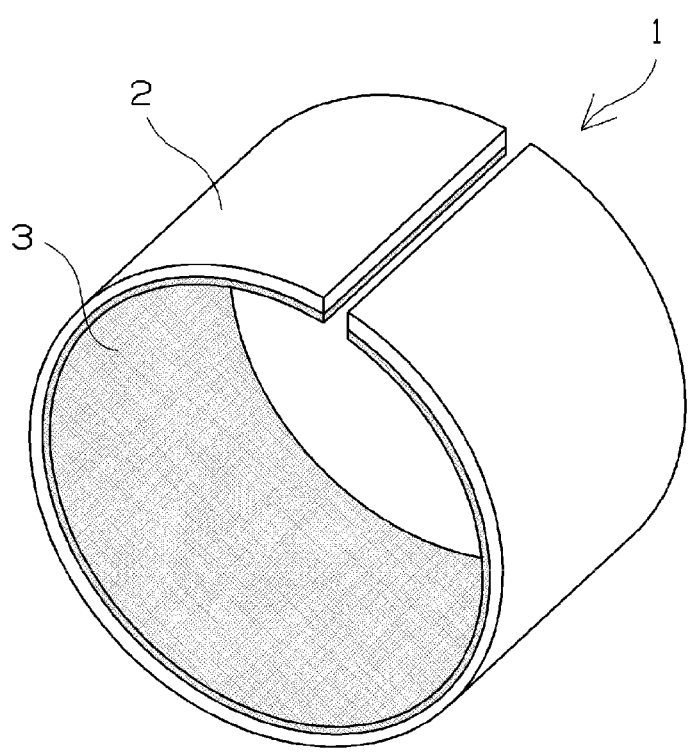
FIG. 1 is a perspective view showing an example of a composite plain bearing (radial composite bearing)
Figure 2:
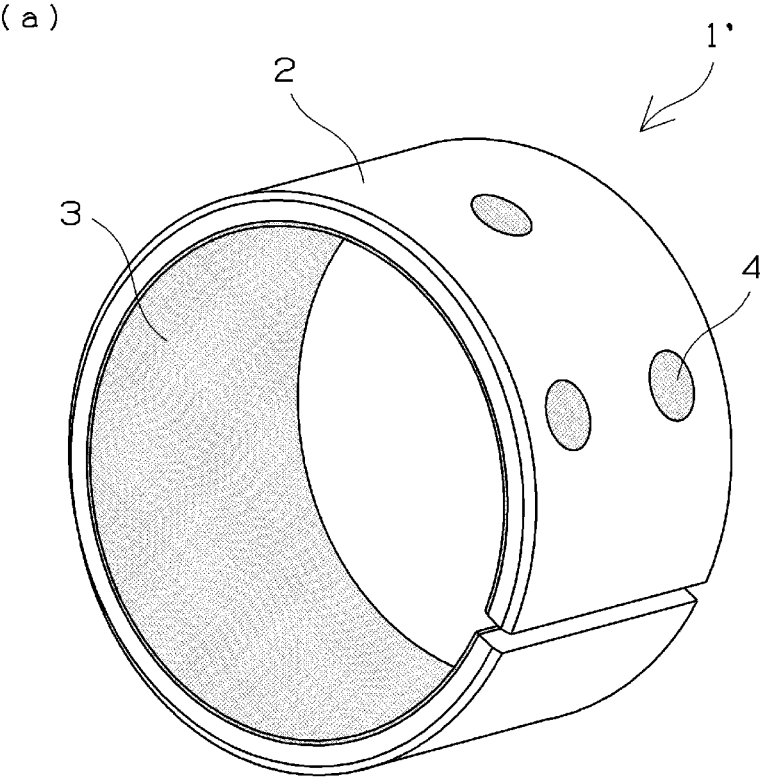
FIG. 2 is a perspective view and a partial cross-sectional view showing another example of a composite plain bearing (radial composite bearing)
Figure 2:
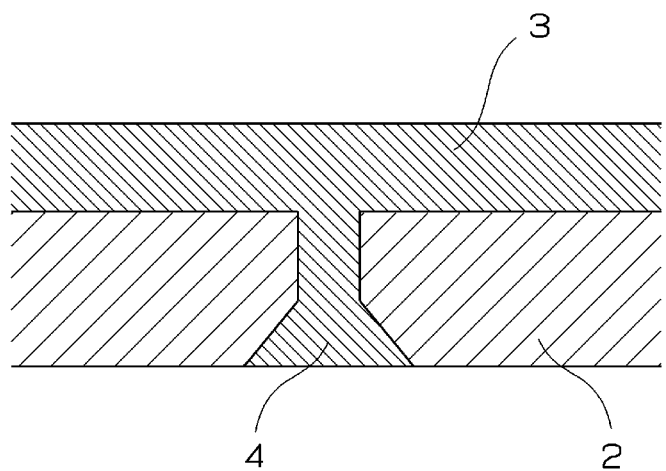

The composite plain bearing of the present invention will be described with reference to FIGS. 1 to 4. FIG. 1 is a perspective view showing an example of the composite plain bearing of the present invention. The composite plain bearing shown in FIG. 1 is a cylindrical plain bearing having a cutaway part in a portion of the circumferential direction, and has an ingot metal plate 2 and a resin layer 3 composed of a resin composition having an aromatic PEK resin as a resin base. The resin layer 3 is overlaid on and provided integrally to the surface of the ingot metal plate 2 on the inside diameter side to a thickness of 0.1 to 0.7 mm by injection molding. In other words, the ingot metal plate 2 is inserted into a metal mold and the resin layer 3 is formed by injection molding (insert molding). The inside-diameter surface of the resin layer 3 is a sliding surface for supporting a counterpart material.

Dissipation of frictionally evolved heat is excellent when the resin layer 3 is used as a sliding surface and the ingot metal plate 2 used as a base material. The internal peripheral surface of a conventional plain bearing subjected to cutting, grinding, or other mechanical machining to thereby finish the inside diameter dimension of the sliding surface and to improve roundness. However, the sliding surface (resin layer) of the composite plain bearing of the present invention can be finished by injection molding, and cutting, grinding, and other mechanical machining can be omitted. As a result, manufacture with high productivity is possible.

FIG. 2(a) is a perspective view and a partial cross-sectional view showing another example of a composite plain bearing of the present invention, and FIG. 2(b) is a partial enlarged cross-section view of a physical securing part in FIG. 2(a). The composite plain bearing 1' shown in FIG. 2(a) is a plain bearing having a hole (physical fixing hole) formed in the ingot metal plate 2 through to the opposite surface so as to intersect at an angle of 45 to 90 degrees with respect to the face joined to the resin layer 3. In the mode shown in the drawing, the hole intersects at 90 degrees with respect to the joining face. Molten resin is filled into the hole portion and solidified during injection molding to thereby form a physical securing part 4 integrated with the resin layer 3, as shown in FIG. 2(b). Forming a physical securing part dramatically improves the fixing force of the resin layer against the frictional force of the bearing in the rotational direction, and serves a safety design.

The shape of the hole serving as a physical securing part is not particularly limited, and the through portion from the joining face to the opposite surface may be round, square, or another shape, and examples of the side end part on the opposite surface include a straight shape, a tapered shape, a and a countersunk screw shape (FIG. 2(b)). A tapered shape or a countersunk screw shape, which is less liable to dislodge from the opposite surface to the joining face, is preferably used as the shape of the side end part on the opposite surface. Also, the number and arrangement of holes can be designed so that sufficient fixing force against the frictional force of the bearing in the rotational direction is obtained.

Figure 3:
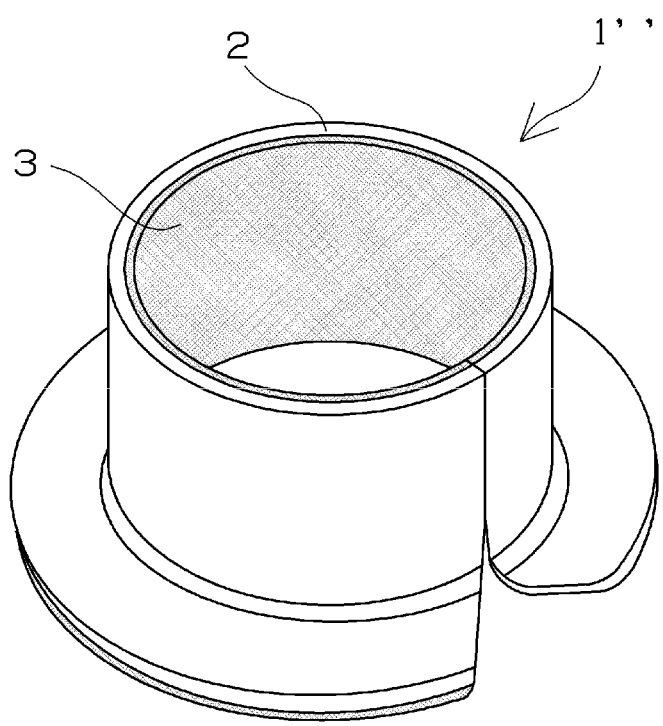
FIG. 3 is a perspective view showing another example of a composite plain bearing (radial and thrust composite bearing)

FIG. 3 is a perspective view showing another example of a composite plain bearing of the present invention. The composite plain bearing 1" shown in FIG. 3 is provided with a resin layer 3 on the inside diameter side of a flanged cylindrical ingot metal plate 2, and is capable of simultaneously supporting a radial load and an axial load.

The composite plain bearing of the present invention is provided with the resin layer on one or more side surfaces selected from the inside diameter side, the outside diameter side, and the end face side of an ingot metal plate rounded in a cylindrical shape (FIG. 1) or a flanged cylindrical shape (FIG. 3), and therefore has versatility for withstanding one or more radial and axial loads. The composite plain bearing of the present invention is also a low-cost bearing capable of withstanding high loads as a plain bearing for a liquid lubricant lubricated by oil or grease.

The resin layer 3, ingot metal plate 2, and the joining structures thereof constituting the composite plain bearing of the present invention will be described in detail below.

Using a resin composition having an aromatic PEK resin as a base resin in the resin layer 3 results in a composite plain bearing having excellent heat resistance, oil and chemical resistance, creep resistance, and frictional abrasion resistance. Also, a PEK resin has toughness, high mechanical properties at high temperatures, and excellent fatigue resistance and impact resistance, and the resin layer is therefore unlikely to peel away from the ingot metal plate when frictional force, impacts, vibrations, and the like are applied during use. In order to use the composite plain bearing of the present invention as a substitute for a metal thrust needle bearing, a heat deformation temperature (ASTM D648) at about 150° C. or higher is required as a resin layer, but the use of the resin composition described above allows this requirement to be satisfied.

The aromatic PEK resin has excellent resistance to various chemicals and excellent oil resistance. Therefore, the composite plain bearing of the present invention can be advantageously used as a bearing lubricated by hydraulic oil, refrigeration machine oil, lubrication oil, transmission oil, engine oil, brake oil, and other oils or greases.

Examples of the aromatic PEK resin that can be used in the present invention includes polyether ether ketone (PEEK) resin, polyether ketone (PEK) resin, and polyether ketone ether ketone ketone (PEKEKK) resin. Examples of commercially available PEEK resins that can be used in the present invention include VICTREX PEEK (90P, 150P, 380P, 450P, 90G, 150G, and the like) manufactured by Victrex plc; Keta Spire PEEK (KT-820P, KT-880P, and the like) manufactured by Solvay Specialty Polymers; VESTAKEEP (1000G, 2000G, 3000G, 4000G, and the like) manufactured by Daicel-Evonik, Ltd. An example of the PEK resin is VICTREX HT manufactured by Victrex plc, and an example of the PEKEKK resin is VICTREX ST manufactured by Victrex plc.

The thickness of the resin layer 3 is set to 0.1 to 0.7 mm. "The thickness of the resin layer" in the present invention is the thickness of the surface portion that does not enter into the ingot metal plate (the portion excluding the physical securing part), along the direction that receives the load, and is the thickness in the radial direction when the bearing is a radial plain bearing and the thickness in the axial direction when the bearing is a thrust plain bearing. The range of thickness is set with consideration given to the aspects of insert molding and physical properties. Insert molding is difficult when the thickness of the resin layer is less than 0.1 mm. Also, durability during long-term use, i.e., service life is liable to be reduced. On the other hand, when the thickness of the resin layer exceeds 0.7 mm, sink marks are liable to occur and dimensional precision is reduced. Also, friction-induced heat is unlikely to escape from the friction surface to the ingot metal plate and the friction surface temperature is increased. Furthermore, the amount of load-induced deformation is increased, the true area of contact in the friction surface is increased, frictional force and frictional heating are increased, and seizing resistance is liable to be reduced. The resin thickness is preferably 0.2 to 0.6 mm when consideration is given to heat dissipation of frictional heating to an ingot metal plate. The resin may be finishing to a required thickness by machining after injection molding (insert molding) when higher dimensional precision is required.

The thickness of the resin layer 3 is preferably ⅛ to 1 of the thickness of the ingot metal plate 2. When the thickness of the resin layer is less than ⅛ the thickness of the ingot metal plate, the resin layer is relatively too thin with respect to ingot metal plate and is liable to have inferior durability during long-term use. On the other hand, when the thickness of the resin layer exceeds the thickness (an equal thickness) of the ingot metal plate, the resin layer becomes relatively too thick with respect to the ingot metal plate, friction-induced heat is unlikely to escape from the friction surface to the ingot metal plate, and the friction surface temperature is increased. Also, the amount of load-induced deformation is increased, the true area of contact in the friction surface is increased, frictional force and frictional heating are increased, and seizing resistance is liable to be reduced. Furthermore, the integrated ingot metal plate is liable to warp due to molding contraction of the resin layer. Additionally, setting the thickness of the resin layer to above-stated range (0.1 to 0.7 mm: ⅛ to 1 of the thickness of the ingot metal plate) facilitates stable dispersion of a later-described fibrous filler in an oriented state.

The inside diameter of the composite plain bearing is not particularly limited, by an inside diameter of φ1 mm to φ100 mm is preferred, and an inside diameter of φ3 mm to φ30 mm is more preferred. When the thickness of the resin layer with respect to the inside diameter of the composite plain bearing is excessive, machining for rounding and the like is liable to become difficult.

The material of the ingot metal plate 2 is preferably iron, aluminum, aluminum alloy, copper, or copper alloy. Using these materials makes it possible to ensure required thermal conductivity and load resistance in the ingot metal plate, facilitates heat dissipation from the resin layer to the ingot metal plate, and from the ingot metal plate to the exterior, and allows use even under a high load. Examples of the iron include carbon steel for general structures (SS400 or the like), soft steel (SPCC, SPCE, or the like), and stainless steel (SUS304, SUS316, or the like), and these irons may be plated with zinc, nickel, copper, or the like. Soft steel (SPCC, SPCE, or the like) is suitable for rounding machining. Examples of the aluminum include A1100 and A1050, examples of the aluminum alloy include A2017 and A5052 (including alumite-treated products), an example of the copper is C1100, and examples of the copper alloy include C2700 and C2801.

The higher the thermal conductivity is the more readily the ingot metal plate 2 will dissipate frictional heat. Therefore, soft steel is preferred as the iron in that thermal conductivity is about four times greater than stainless steel, and aluminum or an aluminum alloy (2.5 times greater thermal conductivity than soft steel) and copper or a copper alloy (about 4.5 times greater thermal conductivity than soft steel) are more preferred. However, when consideration is given to a balance between low cost and heat dissipation, soft steel (including plated products), aluminum, or an aluminum alloy is preferably used as the ingot metal plate.

The thickness of the ingot metal plate 2 is not particularly limited and is preferably thicker than the resin layer 3 at 0.5 to 5 mm, or even more preferably 0.7 to 2.5 mm.

The joining face of the ingot metal plate 2 to the resin layer 3 is preferably roughened to form concavo-convex shapes using a shot blast or a tumbler, or by machining or the like in order to increase close adhesion with the resin layer during insert molding. The surface roughness after doing so is preferably Ra 4 µm or higher. The surface of the ingot metal plate 2 may also undergo metal plating or other surface treatment.

The joining face of the ingot metal plate 2 to the resin layer 3 is preferably subjected to a chemical surface treatment in order to increase close adhesion between the ingot metal plate 2 and the resin layer 3. The chemical surface treatment is preferably (1) a treatment by which very small concavo-convex shapes are formed on the joining face, or (2) a treatment in which a joining film that chemically reacts with the resin layer is formed on the joining face.

Endowing the joining face with very small concavo-convex shapes increases the true joining surface area, improves close adhesive strength between the resin layer and the ingot metal plate, and facilitates the transmission of heat in the resin layer to the ingot metal plate. Also, interposing a joining film that chemically reacts with the resin layer on the joining face improves the close adhesive strength between the resin layer and the ingot metal plate, eliminates micro-gaps between the resin layer and the ingot metal plate, and facilitates the transmission of heat in the resin layer to the ingot metal plate.

Examples of surface-roughening treatments for forming very small concavo-convex shapes include methods for dissolving the surface of the ingot metal plate using an acid solution treatment (sulfuric acid, nitric acid, hydrochloric acid, and the like, or mixtures with other solutions) and alkali solution treatment (sodium hydroxide, potassium hydroxide, and the like, or mixtures with other solutions). The very small concavo-convex shapes may differ due to concentration, treatment time, post-treatment, and the like, but are preferably very small concavities and convexities having a concavity pitch of several nanometers to several tens of micrometers in order to increase close adhesion by anchoring effect. Examples other than general acid solution treatments and alkali solution treatments include a special AMALPHA treatment manufactured by MEC Co., Ltd., and NMT treatment manufactured by Taiseiplas Co., Ltd. In the case of NMT treatment, the base material is subjected in sequence to a degreasing treatment by alkali solution, a neutralization treatment by acid solution, immersion treatment by special solution, and post-treatments such as water-washing and drying, and then a treatment for forming the very small concavo-convex shapes on the surface of the base material.

When the resin layer 3 is to be formed by injection molding, a resin material is made to flow at high speed and high pressure, so the resin material can flow deeply into the very small concavo-convex shapes having a concavity pitch of several nanometers to several tens of micrometers by shearing force. The close-adhesive strength between the ingot metal plate 2 and the resin layer 3 can thereby be ensured. Also, the very small concavo-convex shapes formed by chemical surface treatment are different from shapes obtained by simple mechanical roughening, have a complex three-dimensional porous structure, and therefore readily demonstrate an anchoring effect and can provide firm close adhesion.

Examples of surface treatments by which a joining film is formed for chemically reacting with the resin layer 3 include immersion treatments in a solution of a triazole dithiol derivative, an s-triazine compound, or the like. These surface treatments cause a reaction with the resin material by heating when the treated ingot metal plate is placed in a mold and insert molded, and increase the close adhesion between the resin layer and the ingot metal plate. An example of such a surface treatment is TRI treatment produced by Toa Denka KK.

Among chemical surface treatments, special surface treatments such as AMALPHA treatment produced by MEC Co., Ltd. and TRI treatment produced by Toa Denka KK are suitable for aluminum and copper. Accordingly, when these treatments are carried out, at least the surface of the ingot metal plate is preferably aluminum or copper.

The shearing close-adhesive strength between the ingot metal plate 2 and the resin layer 3 is preferably 2 MPa or more (safety factor at a surface pressure of 10 MPa and a friction coefficient of 0.1 is double or greater). In this range, sufficient close-adhesive strength with respect to frictional force during service can be obtained, and the resin layer does not peel away from the ingot metal plate even when used as a plain bearing under high PV conditions. The shearing close-adhesive strength is preferably 5 MPa or greater in order to further enhance the safety factor. The physical securing part described above (FIG. 2(*b*)), mechanical surface-roughening treatment, chemical surface-roughening treatment, and other means for improving close-adhesive strength are preferably selected, as appropriate, and used in combination so as that the shearing close-adhesive strength noted above can be ensured. Providing a physical securing part dramatically improves the strength for fixing the resin layer with respect to frictional force in the direction of rotation of the bearing, and when rounding machining is carried out after resin layer formation, the resin layer is liable to partially peel away from the ingot metal plate at a surface other than the fixing part when fixing is achieved solely by the physical securing part. Accordingly, in this case, the entire joining face is preferred subjected to a surface-roughening treatment.

The resin composition for forming the resin layer 3 can be obtained by using the aromatic PEK resin as the base resin, and blending therewith glass fibers, carbon fibers, aramid fibers, whiskers, or another fibrous filler in a dispersed state. The mechanical strength of the resin layer can thereby be further enhanced. In the particular case of the composite plain bearing of the present invention, the resin layer is thin, i.e., a thickness of 0.1 to 0.7 mm and the enhancement to mechanical strength is desirable.

In addition to a fibrous filler, it is also possible to add a PTFE resin, graphite, molybdenum disulfide, and other solid lubricants, and calcium carbonate, calcium sulfate, mica, talc, and other inorganic fillers. Blending a solid lubricant noted above reduces friction even in conditions in which there is no lubricant or the lubricating oil has become diluted, and seizing resistance can be enhanced. Also, adding an inorganic filler noted above makes it possible to enhance creep resistance.

The fibrous filler, inorganic solid lubricant (graphite, molybdenum disulfide, and the like), and inorganic fillers have the effect of reducing the molding shrinkage factor of the aromatic PEK resin. Accordingly, there is also an effect in which internal stress in the resin layer is suppressed during insert molding with the ingot metal plate.

When forming the resin layer by injection molding, the melt flow direction of the resin composition is preferably adjusted to thereby cause the (lengthwise direction of the) fibrous filler to be oriented at an intersecting angle of 45 degrees or more and as near to a right angle as possible with respect to the rotational direction (sliding direction) of the bearing. In this case, the intersecting angle of at least 50% of the fibers per unit surface area of the fibrous filler, or the average intersecting angle, is preferably within a predetermined range of intersecting angles in any cross section, excluding the gate part and the weld part of the resin.

The fibrous filler is preferably added in order to enhance the mechanical strength of the resin layer, but since the end parts of the fibers of the fibrous filler are edge shaped, a counterpart material is readily physically abraded and damaged by the end parts of the fibers, and also the frictional coefficient is difficult to stabilize. Orienting the (lengthwise direction of the) fibrous filler so as to intersect the rotational direction of the plain bearing at 45 to 90 degrees causes the edges of the two ends of the fibers to face 45 to 90 degrees with respect to the rotational direction. Abrasive damage to a counterpart material due to the edges of the two ends of the fibers can thereby be reduced and the friction coefficient can be stabilized. In order to orient the fibrous filler so as to intersect the rotational direction of the plain bearing at 45 to 90 degrees, the melt flow direction of the resin composition when molded onto the ingot metal plate is made to be the same direction. The nearer the orientation of the fibrous filler is to 90 degrees, the lesser the abrasive damage will be due to the edges of the fibers, and such is preferred in that the friction coefficient is also stabilized. Particularly preferred is 80 to 90 degrees. The orientation of the fibrous filler may be disorganized in the gate part and weld part during injection molding, but the percentage thereof is low and has no effect.

The average fiber length of the fibrous filler is preferably 0.02 to 0.2 mm. When the average fiber length is less than 0.02 mm, sufficient reinforcement effect cannot be obtained, and creep resistance and abrasion resistance are liable to be unsatisfactory. Keeping the average fiber length of the fibrous filler within the above-stated range allows stable melt fluidity to be ensured even when thin insert molding of 0.1 to 0.7 mm is to be carried out. When the average fiber length exceeds 0.2 mm, the thin moldability is degraded because the ratio of fiber length to layer thickness of the resin layer is increased. In the particular case of insert molding to a resin thickness of 0.2 to 0.7 mm, thin moldability is inhibited when the fiber length exceeds 0.2 mm. The average fiber length is preferably 0.02 to 0.1 mm in order to further enhance stability of thin molding.

Among fibrous fillers, carbon fibers are preferably used in that the ingot metal plate, which is a counterpart material, is less liable to be abraded and damaged under high PV, the mechanical properties at high temperature are high, and anti-fatigue characteristics, creep resistance, and abrasion resistance can be improved. Also, carbon fibers have strong orientation in the melt flow direction of the resin when the resin layer is molded.

In the particular case that relatively short and narrow-diameter carbon fibers are selected, the edges of at the two ends of the carbon fibers may align with the rotational direction of the composite plain bearing when the direction of orientation is less than, e.g., 45 degrees, the counterpart material may be damaged. Accordingly, in order to improve durability and stabilize bearing torque at a low level when short narrow carbon fibers are used, it is very advantageous to set the flow direction of the molten resin to be a right angle or nearly a right angle to the rotational direction of the composite plain bearing when the resin is injection molded, and cause the lengthwise direction of the fibers to be oriented so as to be 45 to 90 degrees with respect to the rotational direction of the composite plain bearing.

The carbon fibers to be used in the present invention may be pitch or PAN carbon fibers sorted from a starting material, but PAN carbon fibers, which have a high modulus of elasticity, are preferred. The baking temperature is not particularly limited, but a carbonized product baked at about 1000 to 1500° C. is preferred over a product baked at a high temperature of 2000° C. or higher to produce a graphitized (black lead) product, because the ingot metal plate, which is a counterpart material, is not likely to be abrasively damaged even under high PV. Using PAN carbon fibers as the carbon fibers increases the modulus of elasticity of the resin layer, and the deformation and abrasion of the resin layer is reduced. Furthermore, the true contact surface area of the friction surface is reduced, and friction-induced heat alleviated.

The average fiber diameter of the carbon fibers is 20 µm or less, and preferably 5 to 15 µm. Extreme pressure is generated when thick carbon fibers exceeding this range are used and such carbon fibers are therefore not preferred in that the effect of improving load resistance is poor, and when the counterpart material is an aluminum alloy, an unquenched steel material, or the like, abrasive damage to the counterpart material is increased. The carbon fibers may also be chopped fibers or milled fibers, but in order to achieve stable thin moldability, milled fibers having a fiber length of less than 1 mm are preferred.

Commercially available examples of the carbon fibers that may be used in the present invention include pitch carbon fibers such as KRECA M-101S, M-107S, M-101F, M-201S, M-207S, M-2007S, C-103S, C-106S, and C-203S manufactured by Kureha Corp. Similarly, examples of the PAN carbon fiber include Besfight HTA-CMF0160-0H, Besfight HTA-CMF0040-0H, Besfight HTA-C6, and Besfight HTA-C6-S manufactured by Toho Tenax, or Torayca MLD-30, Torayca MLD-300, Torayca 1008, and Torayca 1010 manufactured by Toray Industries, Inc.

The resin composition for forming the resin layer preferably has the above-described aromatic PEK resin as a base resin, and additionally contains an above-noted carbon fiber, and a PTFE resin, which is a solid lubricant, as essential components.

A molding powder obtained by suspension polymerization, a fine powder obtained by emulsification polymerization, or a recycled PTFE may be used as the PTFE resin. A recycled PTFE, which is unlikely to increase in melt viscosity and which is unlikely to form fibrils by shearing during molding, is preferably used in order to stabilize the fluidity of a resin composition having an aromatic PEK resin as the base resin.

A recycled PTFE is a heat-treated (having a heat history) powder, a powder irradiated with a γ-ray or an electron beam, or the like. Examples of such types include: a powder obtained by heat treating a molding powder or a fine powder, or a powder obtained by further irradiating these powders with γ-rays or an electron beam; a powder obtained by pulverizing a molded article composed of a molding powder or a fine powder, or a powder obtained by thereafter irradiating these powders with γ-rays or an electron beam; and a powder obtained by irradiating a molding powder or a fine powder with γ-rays or an electron beam. Among recycled PTFE types, a PTFE resin irradiated with γ-rays, an electron beam, or the like is more preferably used because it does not aggregate, does not form fibrils at all at the melting temperature of an aromatic PEK resin, has internal lubricating effect, and is capable of stabilizing and improving fluidity of a resin composition having an aromatic PEK resin as the base resin.

Examples of commercially available PTFE resins that may be used in the present invention include: KTL-610, KTL-450, KTL-350, KTL-8N, and KTL-400H manufactured by Kitamura, Ltd.; Teflon (registered trademark) 7-J and TLP-10 manufactured by Du Pont-Mitsui Fluorochemicals Co., Ltd.; Fluon G163, L150J, L169J, L170J, L172J, and L173J manufactured by Asahi Glass Co., Ltd.; Polyflon M-15 and Lubron L-5 manufactured by Daikin Industries, Ltd.; and Hostaflon TF9205 and TF9207 manufactured by Hoechst AG. Also possible is a PTFE resin modified using a side chain group having a perfluoroalkylether group, fluoroalkyl group, or other fluoroalkyl. Among the above, examples of the PTFE resin irradiated with γ-rays, an electron beam, or the like include: KTL-610, KTL-450, KTL-350, KTL-8N, and KTL-8F manufactured by Kitamura, Ltd.; and Fluon L169J, L170J, L172J, and L173J manufactured by Asahi Glass Co., Ltd.

Well-known additives for resins may be added to the resin composition in amounts that do not inhibit the effects of the present invention. Examples of these additives include: boron nitride and other friction characteristics improvers; carbon powder, iron oxide, titanium oxide, and other colorants; and graphite, metallic oxide powders, and other thermal conductivity improvers.

The resin composition for forming the resin layer preferably contains an aromatic PEK resin as the base resin, and 5 to 30 vol % of carbon fiber and 1 to 30 vol % of PTFE resin as essential components. The remainder excluding these essential components and other additives is an aromatic PEK resin. When this blend ratio used, deformation and abrasion of the resin layer is low, aggression against the counterpart material is low, and resistance to oil and the like is enhanced, even in high PV conditions. The carbon fiber is more preferably 5 to 20 vol %, and the PTFE resin is more preferably 2 to 25 vol %.

When the blend ratio of carbon fiber exceeds 30 vol %, melt fluidity is dramatically reduced, thin molding becomes difficult, and abrasive damage is liable to occur when the counterpart material is an aluminum alloy, an unquenched steel material, or the like. Also, when the blend ratio of carbon fiber is less than 5 vol %, the effect of reinforcing the resin layer is poor, and it may not be possible to obtain sufficient creep resistance and abrasion resistance.

When the blend ratio of the PTFE resin exceeds 30 vol %, abrasion resistance and creep resistance are liable to be reduced below a required level. When the blend ratio of the PTFE resin is less than 1 vol %, the effect of imparting required lubricity to the composition is poor, and sufficient sliding characteristics may not be obtainable.

It is preferred that the resin composition for forming the resin layer have a melt viscosity of 50 to 200 Pa·s at a resin temperature of 380° C. and a shear rate of 1000 s$^{-1}$. When the melt viscosity is within this range, precision molding is made possible, the fibrous filler can be oriented at a predetermined angle, and thin insert molding of 0.1 to 0.7 mm can be smoothly performed on the surface of the ingot metal plate. When the melt viscosity is less than the predetermined range or exceeds the predetermined range, precise moldability is not reliably obtained, and the fibrous filler is not readily oriented at a predetermined angle. Making thin insert molding possible and making machining unnecessary after insert molding facilitates manufacture and reduces manufacturing costs.

It is preferred that an aromatic PEK resin having a melt viscosity of 130 Pa·s or less in the stated conditions be used in order to bring the melt viscosity to 50 to 200 Pa·s at a resin temperature of 380° C. and a shear rate of 1000 s$^{-1}$. Examples of such an aromatic PEK resin includes VICTREX PEEK (90P and 90G) manufactured by Victrex plc. Using such an aromatic PEK resin facilitates entry of resin material, during injection molding, into very small concavo-convex shapes having a concavity pitch of several nanometers to several tens of nanometers formed by a chemical surface treatment, and makes firm close adhesion possible.

Means for mixing and kneading the various starting materials described above is not particularly limited, and it is possible to dry mix only the powder stating materials using a Henschel mixer, a ball mixer, a ribbon blender, a Lodige mixer, an ultra-Henschel mixer, or the like, and then melt-knead the mixture using a twin-screw extruder or other melt extruder to obtain molding pellets. The filler may be added using a side feeder when the mixture is melt-kneaded in the twin-screw extruder or the like. The use of injection molding produces excellent precision moldability, manufacturing efficiency, and other advantages. It is also possible to use an annealing process or other process to improve physical properties.

An example of a method for manufacturing the composite plain bearing of the present invention is to fabricate an ingot metal plate (flat shape) cut to a desired shape and dimension using a press punch or the like, and placing the ingot metal plate in a mold at the time of injection molding and integrating ingot metal plate with the resin layer by insert molding. The gate scheme (pin gate, disk gate, and the like) and gate position during injection molding is not particularly limited as long as the fibrous filler can be given a desired orientation. The ingot metal plate integrated with the resin layer may be used directly, or may be furthermore cut to a desired shape and dimension, curve machined, rounding machined, otherwise machined to produce a composite plain bearing in the form of a cylindrical shape, a flanged cylindrical shape, a half-divided shape, or another shape integrated with the resin layer. Also, the ingot metal plate having undergone curve machining, rounding machining, or other machining, and cutting to a desired shape and dimension in advance may be placed in a mold and insert molded to produce a composite plain bearing in the form of a cylindrical shape, a flanged cylindrical shape, a half-divided shape, or another shape integrated with the resin layer. With the former fabrication order, stress is concentrated in the curved part or rounded part of the resin layer due to curve machining or rounding machining, and dimensional precision in terms of thickness cannot be improved due to thermoplastic deformation of the resin layer, and therefore the latter fabrication order is preferred. When a physical fixing hole is to be provided in the ingot metal plate, it is cost effective to form the hole with the desired shape and dimensions at the time of press-punching.

A fluid dynamic pressure groove, a lubricating groove, or other groove, and dimples or the like in the form of concavities or convexities or other desired surface shapes can be formed in the sliding surface by mold transfer during injection molding. The depth and width of the grooves or the like can be readily varied. The shape of fluid dynamic pressure groove, lubricating groove, or dimples in the form of concavities or convexities is not particularly limited. Providing a fluid dynamic pressure groove produces dynamic pressure in oil, water, chemical solution, or other lubrication, and the coefficient of friction can be reduced. Also, lubrication grooves, and dimples or the like in the form of concavities or convexities change a lubrication state in the sliding surface to a fluid lubrication, reduce frictional shearing force, and produce low friction and low abrasion. Fluid dynamic pressure grooves, lubrication grooves, and dimples or the like in the form of concavities or convexities increase surface pressure to produce a high surface pressure, even without lubrication (dry), and thereby have the effect of reducing the coefficient of friction due to surface pressure dependency.

The composite plain bearing of the present invention is not particularly limited in shape, and may also support a radial load, an axial load, or both. Specific examples include a laminated thrust bearing, a laminated radial bearing, and a laminated radial and thrust bearing. The composite plain bearing of the present invention is composed of an ingot metal plate and a resin layer having a thickness of 0.1 to 0.7 mm. Since the resin layer (aromatic PEK resin) is a frictional sliding surface, the friction and abrasion characteristics and creep resistance are excellent, and since an ingot metal plate is used as a bearing base material, dissipation of friction-induce heat and load resistance are excellent. Accordingly, a bearing having high heat dissipation, low deformation and abrasion, and a low coefficient of friction is obtained, even for a cylindrical bearing for supporting a radial load, a bearing for supporting a radial load and an axial load, or a thrust washer for supporting an axial load. Since the resin layer is thinly insert molded on the surface of the ingot metal plate, it is possible to obtain a bearing with high dimensional precision. As a result of these results, this plain bearing can be advantageously used in, e.g., a compressor for a room air-conditioner or car air-conditioner, in a transmission in an automobile, construction machinery, or the like, in hydraulic machinery and the like, or as a hinge in a reclining seat in an automobile or the like.

Described below are examples (first to fourth) in which the composite plain bearing of the present invention has been applied to a compressor for a room air conditioner or a car air conditioner as a plain bearing for rotatably supporting a rotating member for driving the compression mechanism thereof.

An example of a single piston-type compressor constituting a vehicle air-conditioning device in FIG. 4 will be described as a first embodiment of a compressor in which the composite plain bearing of the present invention is used.

Figure 4:
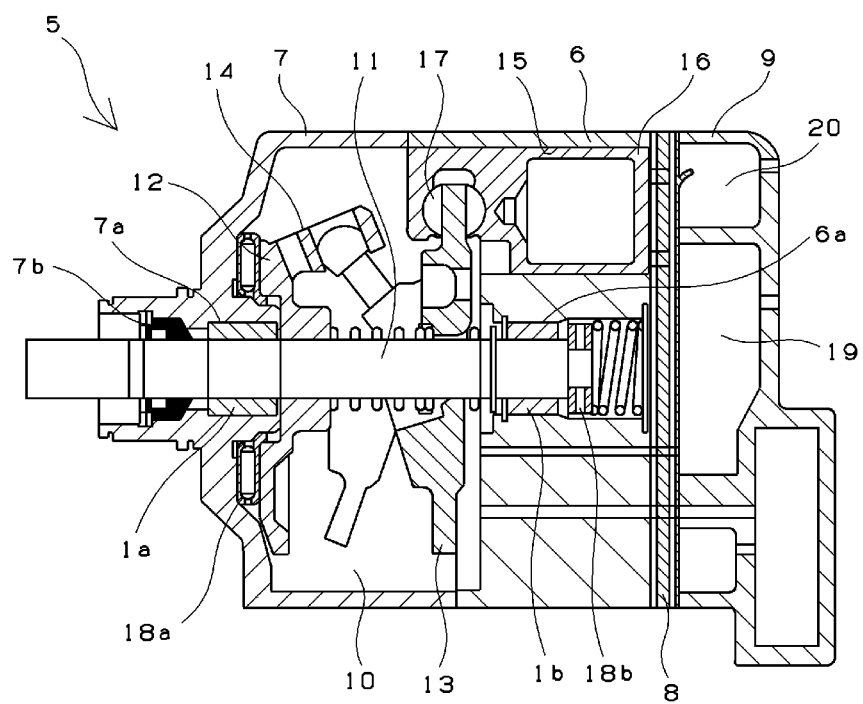
FIG. 4 is a cross-sectional view showing the first embodiment of a compressor using a composite plain bearing.

A compressor 5 has a cylinder block 6, a front housing 7, and a rear housing 9, which constitute the compressor housing, as shown in FIG. 4. The rear housing 9 is joined and fixed to the cylinder block 6 via a valve-forming body 8. In this configuration, a crank chamber 10 is located in the portion enclosed by the cylinder block 6 and the front housing 7. A drive shaft 11 is rotatably supported by being passed through the crank chamber 10 in the housing. A metal shaft or the like is used as the drive shaft 11. One end (the left side in the drawing) of the drive shaft 11 is directly connected to a vehicle engine via a power transmission mechanism. A lug plate 12 made of iron is fixed in the crank chamber 10 so as to be capable of integral rotation. A rotating member is composed of the drive shaft 11 and the lug plate 12.

One end of the drive shaft 11 is rotatably supported by a radial plain bearing 1a fitted into a through-hole 7a provided in the front housing 7. The other end of the drive shaft 11 is rotatably supported by a radial plain bearing 1b fitted into a through-hole 6a provided in the cylinder block 6. The radial plain bearings 1a and 1b are the composite plain bearing of the present invention.

The outside diameter of the radial plain bearings is shaped so as to follow the through-holes 6a, 7a in the compressor. The external peripheral surface of the radial plain bearings and the internal peripheral surface of the through-holes 6a, 7a are set so as to obtain, to the extent possible, a state of close adhesion without a gap. The inside diameter is shaped so as to follow the minimum required clearance for rotational support from the peripheral surface of the drive shaft while supporting the drive shaft 11.

A swash plate 13 serving as a cam plate is accommodated in the crank chamber 10. The swash plate 13 is capable of synchronous rotation with the lug plate 12 and the drive shaft 11 by way of an actuating linkage to the lug plate 12 via a hinge mechanism 14, and by way of support of the drive shaft 11, and is configured so as to be capable of tilting in relation to the drive shaft 11 in accompaniment with the sliding movement of the drive shaft 11 in the axial direction at the center of rotation. A plurality of cylinder bores 15 is formed in the cylinder block 6, and a single pistons 16 are accommodated so as to be capable of reciprocating in the cylinder bores 15. Front and rear apertures of the cylinder bores 15 are blocked off by the valve-forming body 8 and the pistons 16, and a compression chamber for varying the volume in accordance with the reciprocating action of the pistons 16 is formed inside the cylinder bores 15. The pistons 16 are interlocked with the external peripheral part of the swash plate 13 via a shoe 17. This configuration allows the rotational motion of the swash plate 13 that accompanies the rotation of the drive shaft 11 to be converted to a reciprocating rectilinear motion of the pistons 16 via the shoe 17. The pistons 16, the shoe 17, the swash plate 13, the hinge mechanism 14, and the lug plate 12 constitute a crank mechanism, and the crank mechanism, the cylinder block 6, and the drive shaft 11 constitute a compression mechanism.

A thrust roller bearing 18a is disposed between the lug plate 12 and the front housing 7. The thrust roller bearing 18a supports the rotating members (drive shaft 11 and lug plate 12) in the thrust direction, and is disposed on the side that receives the compression reaction force generated in the compression mechanism. The drive shaft 11 is supported at the rear end part by a thrust roller bearing 18b disposed inside the through-hole 6a of the cylinder block 6, is inhibited from rearward thrust movement.

An intake chamber 19 and a discharge chamber 20 are formed in the rear housing 9. Refrigerant gas in the intake chamber 19 is introduced into the cylinder bores 15 via the valve-forming body 8 by the movement of the pistons 16. Low-pressure refrigerant gas introduced into the cylinder bores 15 is compressed to a predetermined pressure by the movement of the pistons 16 and is introduced into the discharge chamber 20 via the valve-forming body 8. The intake chamber 19, the discharge chamber 20, the cylinder bores 15, and the valve-forming body 8 constitute a refrigerant pathway.

In the compressor 5 having the above-described configuration, the swash plate 13 rotates together with the drive shaft 11 when a drive force is supplied to the drive shaft 11 from a vehicle engine via a power transmission mechanism. The pistons 16 reciprocate with a stroke that corresponds to the tilt angle of the swash plate 13 in accompaniment with the rotation of the swash plate 13, and intake, compression, and discharge are repeated in sequence in the cylinder bores 15.

In the first embodiment shown in FIG. 4, the drive shaft 11 makes sliding contact with and is supported by the sliding surface of the resin layer of the radial plain bearings 1a and 1b, which have the above-described excellent heat resistance, low friction, abrasion resistance, load resistance, creep resistance, and the like. Accordingly, abrasion on the sliding contact surface and deformation of the resin layer can be prevented, and low rotational torque can be stably obtained.

A lip seal 7b is provided to the portion further forward (left side in the drawing) from the radial plain bearing 1a of the through-hole 7a, and prevents leakage of refrigerant gas inside the housing to the exterior via the through-hole 7a. In this configuration, the radial plain bearing 1a has excellent dimensional precision and is shaped so as to follow the minimum required clearance for rotational support from the peripheral surface of the drive shaft 11, and the external peripheral surface of the radial plain bearing 1a and the internal peripheral surface of the through-holes 7a are set so as to obtain, to the extent possible, a state of close adhesion without a gap. Accordingly, the pressure in the space between the radial plain bearing 1a and the lip seal 7b in the through-hole 7a is readily kept at a lower level than the pressure of the crank chamber 10. This configuration reduces the burden on the lip seal 7b for preventing leakage of the refrigerant gas in the housing to the exterior via the through-hole 7a.

Furthermore, in the first embodiment, the radial plain bearings 1a and 1b are disposed in the crank chamber 10, which is not included in the resistance pathway in the housing. In accordance with these radial plain bearings 1a and 1b, it is possible for abrasion of the sliding contact part to be prevented between the radial plain bearings 1a and 1b and the drive shaft 11 by the sliding surface of the resin layer, even in the crank chamber 10 in which the circulation rate of the refrigerant gas is relatively low and the lubricating effect of lubricating oil in the form of a mist mixed with the refrigerant gas is low. As a result, the service life of the compressor can be extended. Hence, it is particularly useful to use the radial plain bearings 1a and 1b in the compressor of this embodiment.

A second embodiment of a compressor in which the composite plain bearing of the present invention is used will be described with reference to FIG. 5. In the second embodiment, the configuration of the compressor in the first embodiment shown in FIG. 4 has been modified to a configuration in which a thrust plain bearing 21, which is the composite plain bearing of the present invention, is used in place of the thrust roller bearing 18a. The configuration is otherwise the same as the first embodiment.

Figure 5:
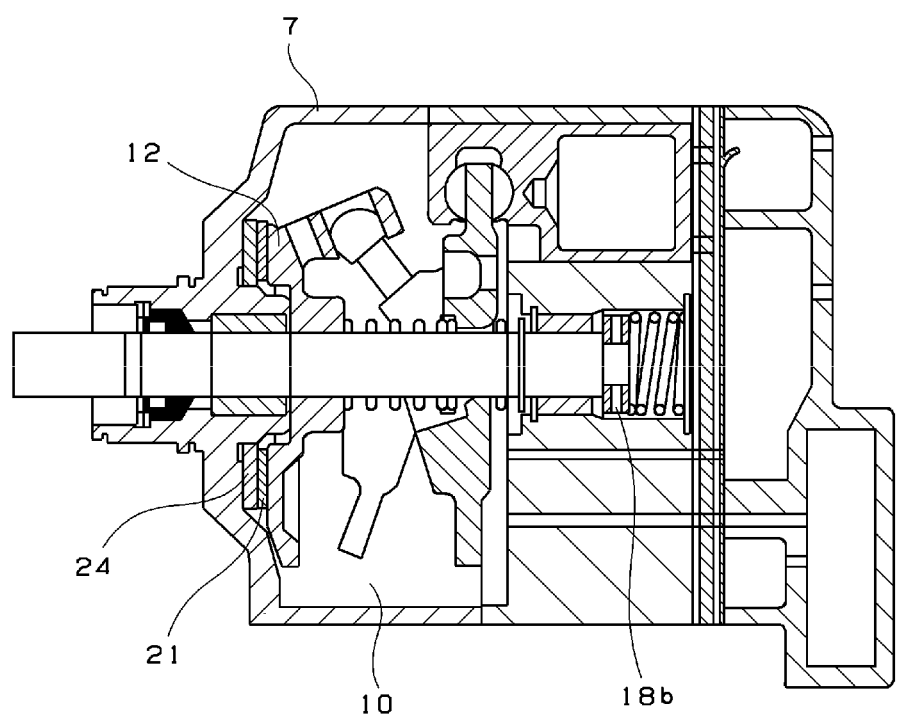
FIG. 5 is a cross-sectional view showing the second embodiment of a compressor using a composite plain bearing.

The thrust plain bearing 21 is disposed between the front housing 7 and the lug plate 12, as shown in FIG. 5. The thrust plain bearing 21 is affixed to the lug plate 12 and is in sliding contact with a ring-shaped plate 24 made of iron fixed to the front housing 7. The thrust movement of the rotating members in the forward direction (left side in the drawing) is inhibited by the sliding contact between the thrust plain bearing and the plate 24. The thrust plain bearing 21 is a composite plain bearing composed of a ring-shaped ingot metal plate and a resin layer provided to the surface of the base material facing the plate 24, and is the same configuration as that shown in FIGS. 1 to 3 and elsewhere, except that the resin layer is provided to the surface of the ingot metal plate in the axial direction.

In the second embodiment, the thrust plain bearing 21 is used as a bearing for supporting the rotating members in the thrust direction on the side for receiving, via the lug plate 12, the compressive reaction force generated in the compression mechanism. In this embodiment, costs can be reduced in comparison with when a roller bearing is used. Also, the thrust plain bearing is capable of preventing abrasion of the sliding contact portion between the thrust plain bearing 21 and the plate 24 by way of the sliding surface of the resin layer while being disposed in the crank chamber 10, which is not included in the refrigerant pathway and in which the lubricating effect is low, in the same manner as the radial plain bearing of the first embodiment. As a result, the service life of the compressor can be extended. Hence, it is particularly useful to use the thrust plain bearing 21 in the compressor of this embodiment.

In this embodiment, it is furthermore possible to use a thrust plain bearing, which is the composite plain bearing of the present invention, in place of the thrust roller bearing 18b.

Figure 6:
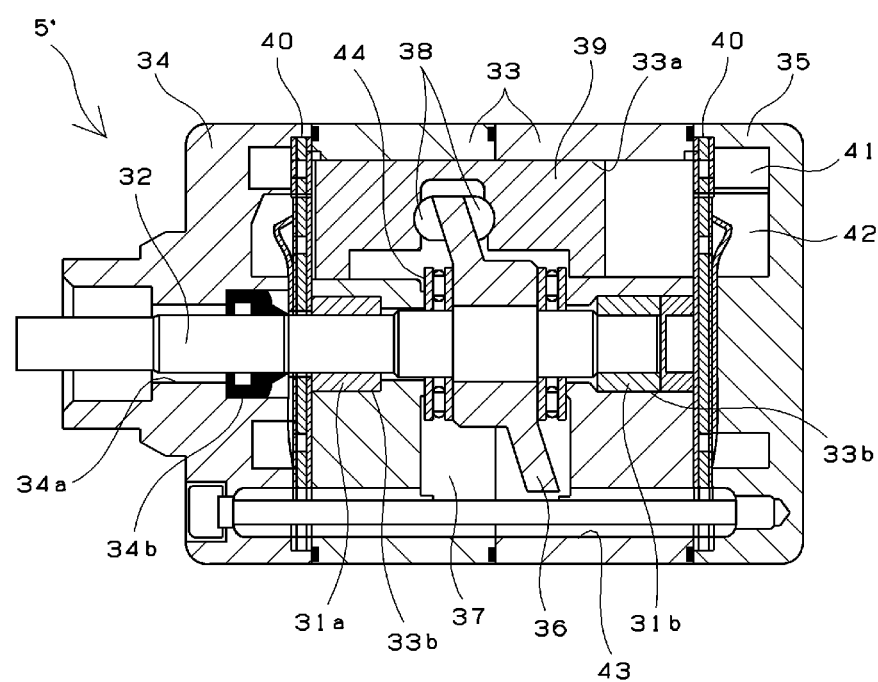
FIG. 6 is a cross-sectional view showing the third embodiment of a compressor using a composite plain bearing.

An example of a dual piston-type compressor constituting a vehicle air-conditioning device shown in FIG. 6 will be described as a third embodiment of a compressor in which the composite plain bearing of the present invention is used. In the compressor 5' of this mode, a pair of cylinder blocks 33, a front housing 34, and a rear housing 35 constitute a housing. A drive shaft 32 and a swash plate 36 fixed to the drive shaft 32 in a crank chamber 37 constitute rotating members. A plurality of cylinder bores 33a is formed at predetermined intervals around the same circumference between the two end parts of the cylinder blocks 33 so as to be parallel to the drive shaft 32. The double piston 39 is fittably supported so as to allow reciprocating movement in the cylinder bores 33a, and a compression chamber is formed between two valve-forming bodies 40 that corresponds to the two end faces thereof. A shoe 38 and swash plate 36 constitute a crank mechanism, and the crank mechanism, the cylinder blocks 33 (cylinder bores 33a), the piston 39, and the drive shaft 32 constitute a compression mechanism.

The drive shaft 32 is rotatably supported in the center of the cylinder blocks 33 and the front housing 34 via a pair of radial plain bearings 31a and 31b, and is actuatably linked to a vehicle engine or other external drive source via a power transmission mechanism. The radial plain bearings 31a and 31b are inserted into an accommodation hole 33b formed in the center of the cylinder blocks 33 so as to be in communication with the crank chamber 37 formed inside the cylinder blocks 33. The radial plain bearings 31a and 31b are the composite plain bearing of the present invention. The specific configuration is the same as the first embodiment, except for the dimensions in the radial and axial directions, and is manufactured using the same manufacturing method.

A pair of thrust roller bearings 44 is disposed between the two end faces in the fore-aft direction of the supporting cylindrical part of the swash plate 36 and the center part of the cylinder blocks 33 facing the two end faces, and is held in a state in which the swash plate 36 is sandwiched between the two cylinder blocks 33 via the thrust roller bearings 44.

A through-hole 34a in the drive shaft and the accommodation hole 33b formed in the cylinder blocks 33 are in communication via a through-hole formed in the valve-forming bodies 40 (left side in the drawing). A lip seal 34b is provided to the through-hole 34a to prevent leakage of refrigerant gas in the housing to the exterior via the through-hole 34a. In this configuration, the radial plain bearing 31a has excellent dimensional precision and is shaped so as to follow the minimum required clearance for rotational support from the peripheral surface of the drive shaft 32, and the external peripheral surface of the radial plain bearing 31a and the internal peripheral surface of the accommodation hole 33b are set so as to obtain, to the extent possible, a state of close adhesion without a gap. Accordingly, the pressure in the space between the radial plain bearing 31a and the lip seal 34b in the through-hole 34a is readily kept at a lower level than the pressure of the crank chamber 37. This configuration reduces the burden on the lip seal 34b for preventing leakage of the refrigerant gas in the housing to the exterior via the through-hole 34a.

In this embodiment, the crank chamber 37, a bolt through-hole 43, an intake chamber 41, a compression chamber, a discharge chamber 42, and the like constitute a refrigerant pathway in the housing. Each location in the refrigerant pathway in the housing is lubricated by a lubrication oil or the like in the form of a mist mixed with the refrigerant gas circulating inside the pathway. Accordingly, in addition to the solid lubrication effect of the resin layer of the plain bearing, the lubricating effect of the lubricating oil provides a considerable contribution to the sliding contact portion between the drive shaft 32 and the radial plain bearings 31a and 31b disposed in the crank chamber 37 (specifically, the accommodation hole 33b) constituting the refrigerant pathway. The sliding contact portion between the drive shaft 32 and the radial plain bearings 31a and 31b is thereby adequately lubricated and the service life of the compressor can be extended.

In this embodiment, the thrust plain bearing, which is the composite plain bearing of the present invention, may furthermore be used in place of the thrust roller bearings 44.

Figure 7:
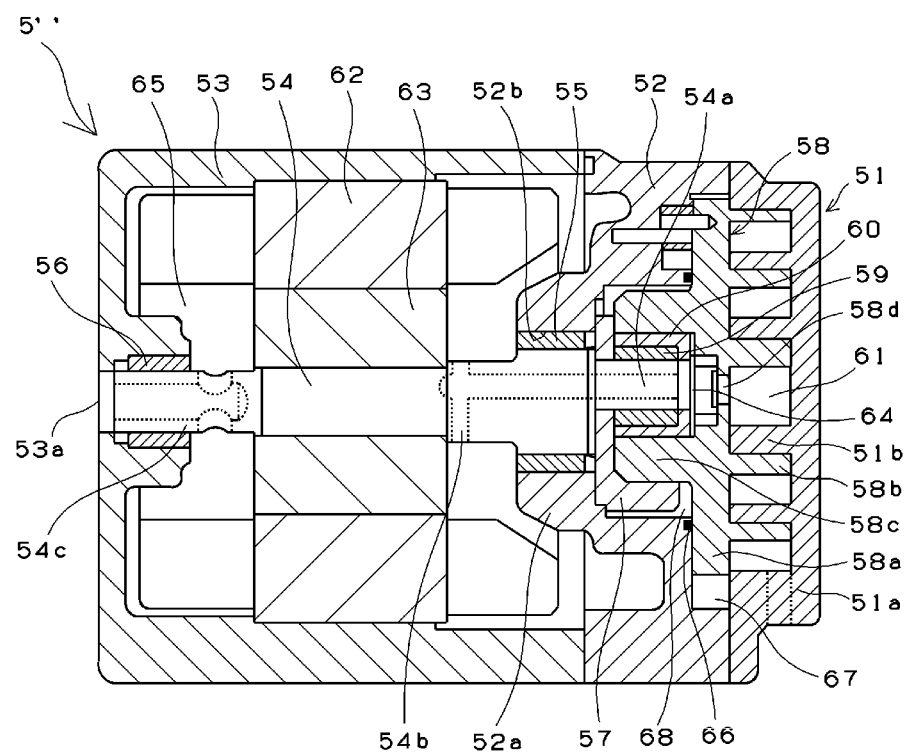
FIG. 7 is a cross-sectional view showing the fourth embodiment of a compressor using a composite plain bearing.

An example of a scroll compressor constituting a vehicle air-conditioning device shown in FIG. 7 will be described as a fourth embodiment of a compressor in which the composite plain bearing of the present invention is used. In the compressor 5" of this mode, a fixed scroll 51, a center housing 52, and a motor housing 53 constitute a housing. A shaft 54 made of iron as the rotating shaft is rotatably supported on the center housing 52 and the motor housing 53 via radial plain bearings 55 and 56. An eccentric shaft 54a is integrally formed on the shaft 54, and a balance weight 57 is supported thereby. The shaft 54 and the balance weight 57 constitute rotating members.

The eccentric shaft 54a is supported so as to be capable of rotation in a relative fashion via a radial plain bearing 59 and a bushing 60 so that a movable scroll 58 faces the fixed scroll 51. The radial plain bearing 59 is fitted and accommodated inside the substantially cylindrical bushing 60 fitted into a boss part 58c protrudingly provided to a moveable base plate 58a. The internal peripheral surface of the radial plain bearing 59 is a sliding contact surface with the external peripheral surface of the eccentric shaft 54a. A movable spiral wall 58b is formed on the moveable base plate 58a of the movable scroll 58, and a fixed spiral wall 51b for meshing with the movable spiral wall 58b is formed on a fixed base plate 51a of the fixed scroll 51. The area partitioned by the fixed base plate 51a, the fixed spiral wall 51b, the moveable base plate 58a, and the movable spiral wall 58b is a sealed chamber 61 for reducing volume in accordance with the rotation of the movable scroll 58. The fixed scroll 51, the movable scroll 58, the center housing 52, the bushing 60, the radial plain bearings 55, 59, the shaft 54, and the balance weight 57 constitute a scroll-type compression mechanism.

Stators 62 as fixed elements are fixed to the internal peripheral surface of the motor housing 53, and rotors 63 as rotating elements are fixed on the external peripheral surface of the shaft 54 in positions that correspond to the stators 62. The stators 62 and the rotors 63 constitute an electric motor, and the rotors 63 and the shaft 54 integrally rotate when the stators 62 are energized. Also, a partition wall part 52a is provided to the center housing 52, and the radial plain bearing 55 is fitted into a through-hole 52b formed in the center of the partition wall part 52a. The internal peripheral surface of the radial plain bearing 55 is a sliding contact surface with the external peripheral surface of the shaft 54.

A fluid channel 54b in communication with a discharge chamber 64 and a motor chamber 65, and a fluid channel 54c in communication with the motor chamber 65 and the exterior of the motor housing 53 are formed inside the shaft 54. In accompaniment with the revolutions of the movable scroll 58, refrigerant gas that has flowed into the sealed chamber 61 from the entrance of the fixed scroll 51 passes through a discharge port 58d, the discharge chamber 64, the fluid channel 54b, the motor chamber 65, and the fluid channel 54c, and flows out to the exterior via an exit 53a provided to the wall part of the motor housing 53. Accordingly, the discharge chamber 64, the fluid channel 54b, the motor chamber 65, and the fluid channel 54c form a high-pressure area having a pressure value substantially equivalent to the discharge pressure. On the other hand, the outer side across from a ring-shaped seal member 66 is a low-pressure chamber 67 having a pressure value approximate to the intake pressure.

The radial plain bearings 55, 56, and 59 are composite plain bearings of the present invention. The specific configuration is the same as the first embodiment, except for the dimensions in the radial and axial directions, and is manufactured using the same manufacturing method.

The radial plain bearings 55 and 59 are shaped so as to follow the minimum required clearance for rotational support from the peripheral surface of the shaft 54 and are in a state inserted into the through-hole 52b and the bushing 60, respectively, and a state in which the shaft 54 (more specifically, the eccentric shaft 54a) has been inserted (in the bearing 59). The external peripheral surface of the radial plain bearing 55 and the internal peripheral surface of the through-hole 52b, and the external peripheral surface of the radial plain bearing 59 and the internal peripheral surface of the bushing 60 are set so as to obtain, to the extent possible, a state of close adhesion without a gap.

Communication between the motor chamber 65 and a space 68 via a gap between the shaft 54 and the through-hole 52b is substantially block off by the radial plain bearing 55, the space being enclosed by the external peripheral side of the boss part 58c and the internal peripheral side of the partition wall part 52a. Communication between the discharge chamber 64 and the space 68 via a gap between the eccentric shaft 54a and the bushing 60 is substantially block off by the radial plain bearing 59. In other words, the radial plain bearings 55 and 59 are disposed so as to completely isolate the internal space of the housing in terms of pressure.

The space 68 is kept in a state of intermediate pressure by pressure regulation of a regulation value and by leakage of refrigerant gas from a high-pressure region (motor chamber 65 and discharge chamber 64) via a slight gap between the shaft 54 and the radial plain bearings 55 and 59, the intermediate pressure being a lower pressure than the high-pressure region and a higher pressure than the low-pressure chamber 67. A region (space 68) having a lower pressure than a high-pressure region is provided to the back surface of the movable scroll 58, whereby the load generated by the movable scroll 58 on the fixed scroll 51 side is reduced by the pressure applied to the back surface of the movable scroll

58. Accordingly, smooth revolution of the movable scroll 58 is obtained, and mechanical loss of the movable scroll 58 is reduced.

The radial plain bearings 55 and 59 have excellent abrasion resistance and other advantages as described above, abrasion of the sliding contact portions with the shaft 54 can therefore be reduced, and it is possible to inhibit a reduction in the pressure isolation effect when the gap between the two is increased by abrasion. In this manner, the radial plain bearings 55 and 59 can demonstrate good seal characteristics against the shaft 54, and this effect can furthermore be readily maintained at a high level. Accordingly, the discharge chamber 64 and the space 68, and the motor chamber 65 and the space 68 can be effectively isolated in terms of pressure without a seal member being especially provided.

A compressor in which the composite plain bearing of the present invention is used was described in the first to fourth embodiments, but the embodiments of the present invention are not particularly limited thereby.

Described next are the cradle guide for a variable capacity axial piston pump and the variable capacity axial piston pump of the present invention.

Figure 10:
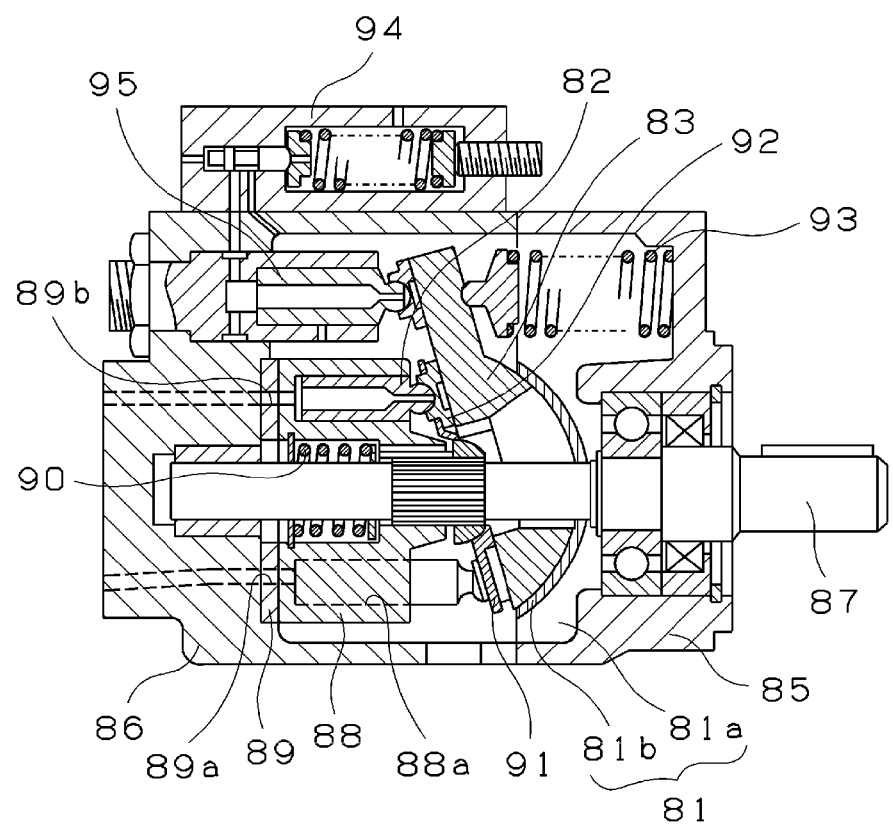
FIG. 10 is a longitudinal sectional view of a variable-capacity axial piston pump using a cradle guide.

An example of a variable capacity axial piston pump in which the cradle guide of the present invention is used will be described with reference to FIG. 10. FIG. 10 is a longitudinal sectional view of a variable-capacity axial piston pump. A cradle guide 81 for a variable capacity axial piston pump makes sliding contact with a cradle 83 for adjusting the stroke of a piston 82, and holds the cradle 83 so as to allow the cradle to pivot, as shown in FIG. 10. The cradle guide 81 has a structure in which a bushing 81*b*, which is a cradle guide seating, is disposed on the surface side of the cradle guide main body 81*a*, i.e., on the sliding surface against the cradle 83. This bushing 81*b* is overlaid on and integrally provided to the sliding surface of a partially cylindrical ingot metal member by injection molding the resin layer composed of a resin composition having an aromatic PEK resin as the base resin to a thickness of 0.1 to 0.7 mm.

The variable capacity axial piston pump of this embodiment has a rotating shaft 87 that is rotatably supported between the joining end walls of a pair of housings 85, 86. A cylinder block 88 is supported so as to be incapable of relative rotation on the rotating shaft 87. A plurality of pistons 82 are accommodated in the cylinder block 88, which integrally rotates with the rotating shaft 87, so as to be capable of sliding displacement in the axial direction of the rotating shaft 87. A piston accommodation chamber 88*a* in the cylinder block 88 operates in coordination with the rotation of the rotating shaft 87 and is connected in alternating fashion to an arcuate intake port 89*a* and discharge port 89*b* formed in a valve plate 89. Hydraulic oil is thereby taken from the intake port 89*a* into the piston accommodation chamber 88*a*, and hydraulic oil inside the piston accommodation chamber 88*a* in the cylinder block 88, which has rotated together with the rotating shaft 87, is discharged to the discharge port 89*b*.

A pressing spring 90 urges the cylinder block 88 to the cradle 83 side. A shoe 92 composed of an aluminum material held by a retainer 91 is in close contact with the flat part of the cradle 83 at the periphery of the rotating shaft 87. The pistons 82 fitted into the shoe 92 reciprocate with a stroke that corresponds to the tilt angle of the cradle 83 in accompaniment with the rotation of the rotating shaft 87. The tilt angle of the cradle 83 is constantly kept at an optimum angle by the pressing force of a pressing spring 93 inside a housing 85 and by hydraulic pressure from a cylinder 95 regulated by a hydraulic pressure control device 94.

Figure 11:
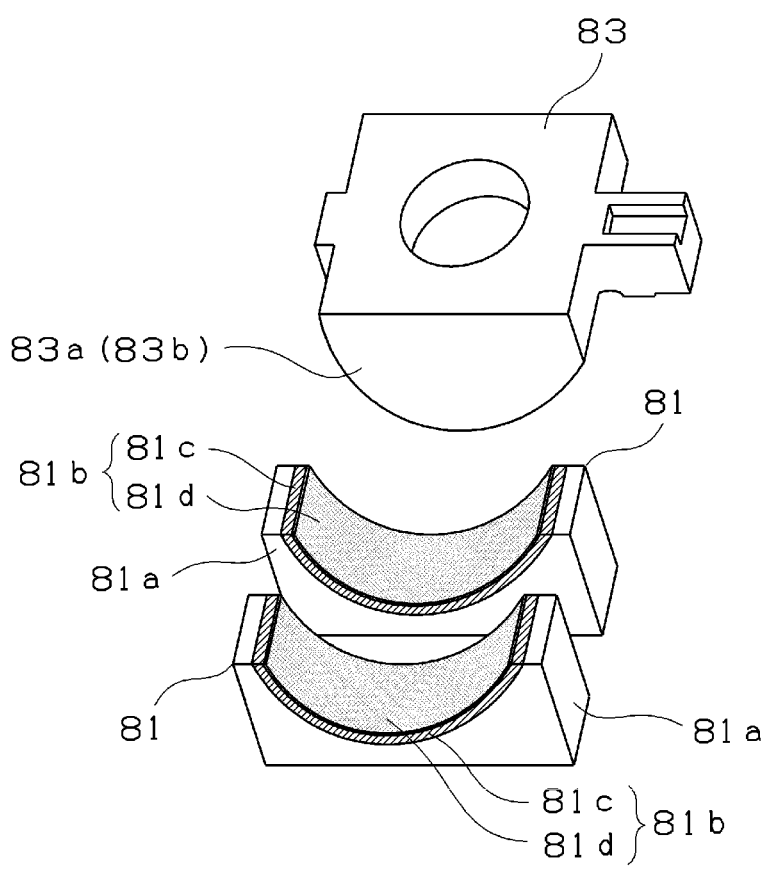
FIG. 11 is a perspective view showing an example of a cradle guide.

FIG. 11 a perspective view of a cradle guide 1. A pair of two cradle guides 81 is disposed inside a housing 85 made of an aluminum alloy, as shown in FIGS. 10 and 11. Also, the rotating shaft 87 is disposed so as to pass through the shaft hole of the cradle 83 between the two cradles guides 81.

In the mode shown in FIG. 11, the cradle guides 81 have a cradle guide main body 81*a*, and a bushing 81*b* composed of a partially cylindrical (arcuate) ingot metal member (ingot metal plate) 81*c* on which the resin layer 81*d* has been formed is disposed on the main body 81*a*. The resin layer 81*d* is thinly formed to a fixed thickness by inserting the ingot metal member 81*c* into a mold, and performing injection molding on the surface of the side that makes sliding contact with the cradle of the ingot metal member 81*c*. The bushing 81*b* is set on the support surface of the cradle 83 formed into an arcuate planar shape in the main body 81*a*. The surface of the ingot metal member 81*c* on the main body 81*a* side is formed into the same shape so as to correspond to the arcuate planar shape of the support surface of the main body 81*a*. The arcuate surface on which the resin layer 81*d* of the bushing 81*b* is formed is a sliding surface against the cradle 83. In this mode, a conventional article is used as the cradle guide main body 81*a*, the bushing 81*b* can be used in the form of a replacement for a conventional thrust bushing, design modifications and the like are made unnecessary, and cost increases can be prevented.

Figure 12:
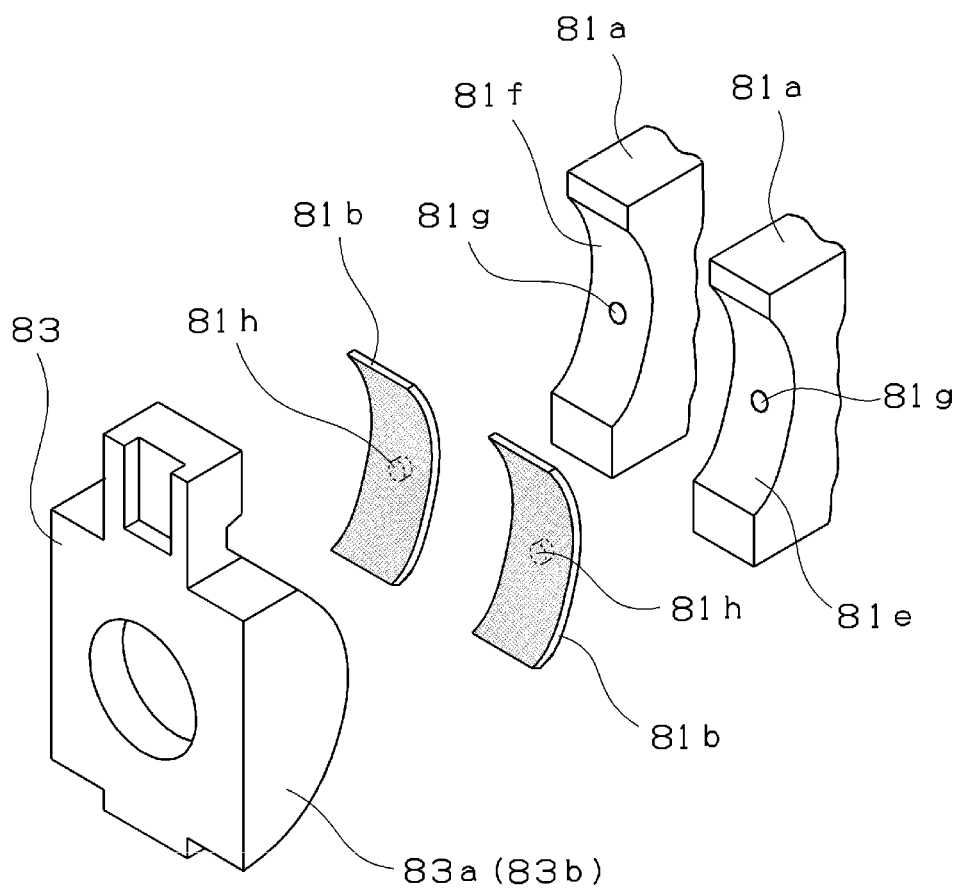
FIG. 12 is an exploded perspective view of the cradle guide of FIG. 11.

A pair of two bushings 81*b* are fixed by concavity 81*g* and a convexity 81*h* being fitted together so that there is no displacement from support surfaces 81*e*, 81*f* of the main body 81*a* of the cradle guide, as shown in FIG. 12. The concavo-convex relationship of the concavo-convex part for fixing the bushings 81*b* in place may be opposite from that shown in FIG. 12, and the shape may be any shape. Alternatively, in consideration of manufacturing costs, the bushings are most preferably fitted together by inserting a pin into the concavity 81*g* and providing a pin hole in the bushings 81*b*.

The material of the main body 81*a* is not particularly limited and may be the same ingot metal as the ingot metal member 81*c*.

The cradle 83 is formed from, e.g., a silicon-containing aluminum alloy, and a pair of arcuate surface-shaped sliding contact parts 83*a*, 83*b* that correspond to the support surfaces 81*e*, 81*f* in the cradle guides is provided in protruding fashion to the back surface of the cradle. In the mode shown in FIGS. 11 and 12, the two sliding contact parts 83*a*, 83*b* are assembled so as to be in contact with the support surfaces 81*e*, 81*f* via pair of bushings 81*b*.

Figure 13:
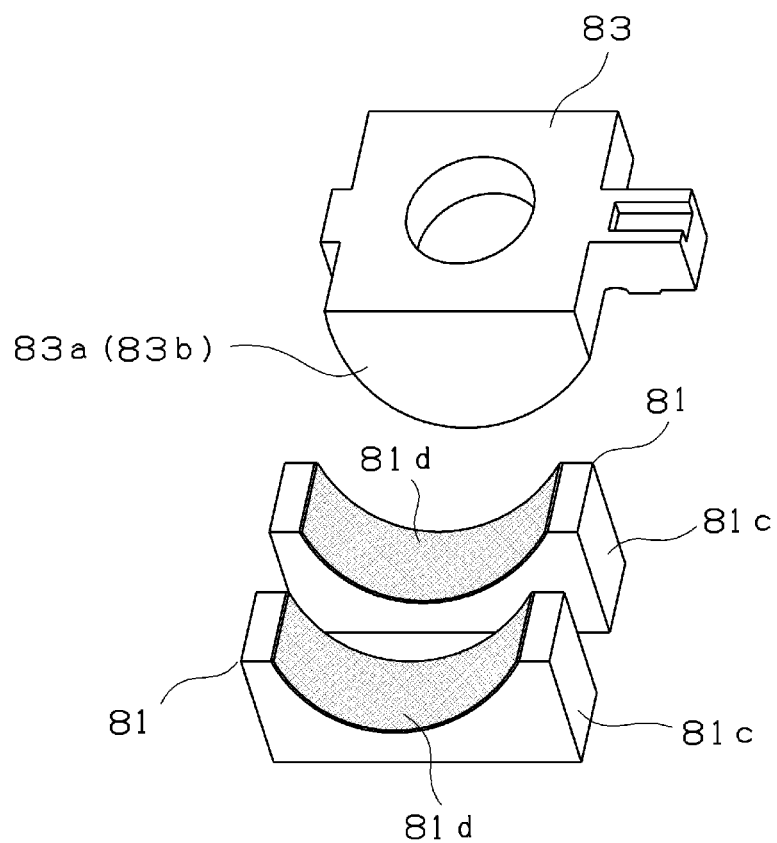
FIG. 13 is a perspective view showing another example of a cradle guide.

Another mode of the cradle guide will be described with reference to FIG. 13. FIG. 13 is a perspective view of another mode the cradle guide 81. In the mode shown in FIG. 13, the main body of the cradle guide 81 is composed of the ingot metal member 81*c*. In this main body, the support surface of the cradle 83 is formed into an arcuate planar shape, and the resin layer 81*d* is thinly formed to a fixed thickness by injection molding on the support surface. The arcuate surface formed by the resin layer 81*d* is the sliding surface against the cradle 83. In this mode, the number of components is low, the structure is simple, and manufacturing costs are reduced.

The resin layer and the ingot metal member in the cradle guide of the present invention will be described in detail.

The resin layer 81*d* is a resin composition in which an aromatic polyether ketone resin is used as a base resin, and is formed by being overlaid on and integrally provided by injection molding to a thickness of 0.1 to 0.7 mm on the surface of the ingot metal member 81c in sliding contact with the cradle.

Using the resin layer 81d as a sliding surface and using the ingot metal member 81c as a base material provide excellent dissipation of friction-induced heat. Since the sliding surface (resin layer) is finished in injection molding, a coating layer is not required to be applied to a steel plate as in a conventional cradle guide, and machining or the like by lathe or polisher can be omitted. As a result, manufacture with high productivity is made possible.

Using a resin composition in which an aromatic PEK resin is used as the base resin in the resin layer 81d results in a cradle guide for a variable capacity axial piston pump having a high continuous-usage temperature, and excellent heat resistance, oil and chemical resistance, creep resistance, and frictional abrasion resistance. Also, a PEK resin has toughness, high mechanical properties at high temperatures, and excellent fatigue resistance and impact resistance, and the resin layer is therefore unlikely to peel away from the ingot metal member when frictional force, impacts, vibrations, and the like are applied during use.

Specific examples of the aromatic PEK resin that can be used in this cradle guide are the same as those used in the composite plain bearing described above.

The thickness of the resin layer 81d is set to 0.1 to 0.7 mm. "The thickness of the resin layer" in the present invention is the thickness of the surface portion that does not enter into the ingot metal member. The range of thickness is set with consideration given to the aspects of insert molding and physical properties. Insert molding is difficult when the thickness of the resin layer is less than 0.1 mm. Also, durability during long-term use, i.e., service life is liable to be reduced. On the other hand, when the thickness of the resin layer exceeds 0.7 mm, sink marks are liable to occur and dimensional precision is reduced. Also, friction-induced heat is unlikely to escape from the friction surface to the ingot metal member and the friction surface temperature is increased. Furthermore, the amount of load-induced deformation is increased, the true area of contact in the friction surface is increased, frictional force and frictional heating are increased, and seizing resistance is liable to be reduced. The resin thickness is preferably 0.2 to 0.5 mm when consideration is given to heat dissipation of frictional heating to an ingot metal member.

In a mode in which a bushing is used as shown in FIG. 11, the thickness of the resin layer 81d is preferably ⅛ to ½ that of the thickness of the ingot metal member (ingot metal plate). When the thickness of the resin layer is less than ⅛ the thickness of the ingot metal member, the resin layer is relatively too thin with respect to ingot metal member and is liable to have inferior durability during long-term use. On the other hand, when the thickness of the resin layer exceeds ½ the thickness of the ingot metal plate, the resin layer becomes relatively too thick with respect to the ingot metal member, friction-induced heat is unlikely to escape from the friction surface to the ingot metal member, and the friction surface temperature is increased. Also, the amount of load-induced deformation is increased, the true area of contact in the friction surface is increased, frictional force and frictional heating are increased, and seizing resistance is liable to be reduced. Additionally, setting the thickness of the resin layer to above-stated range (0.1 to 0.7 mm: ⅛ to ½ that of the thickness of the ingot metal member) facilitates stable dispersion of a later-described fibrous filler in an oriented state.

The ingot metal serving as the material of the ingot metal member 81c is preferably iron, aluminum, aluminum alloy, copper, or copper alloy. Using these materials allows required thermal conductivity and load resistance in the ingot metal member to be ensured, and allows use even under a high load. Examples of the iron include carbon steel for general structures (SS400 or the like), soft steel (SPCC and other cold-rolled steel plates), and stainless steel (SUS304, SUS316, or the like), and these irons may be plated with zinc, nickel, copper, or the like. Examples of the aluminum include A1100 and A1050, examples of the aluminum alloy include A2017 and A5052 (including alumite-treated products), an example of the copper is C1100, and examples of the copper alloy include C2700 and C2801. Among these, when consideration is given to a balance between low cost and heat dissipation, SPCC or other cold-rolled steel plate (including plated products) is preferably used.

In relation to the joining face of the ingot metal member 81c to the resin layer 81d, it is preferred that (1) a sintered metal layer be provided to the joining surface, (2) the joining surface be subjected to a chemical surface treatment, (3) the joining surface be mechanically roughed, or that some other pretreatment be performed in order to increase close adhesion with the resin layer during insert molding. The treatments of (1) to (3) may be used in a suitable combination. These pretreatments for improving close adhesion may be performed for at least the joining face, or may be performed for the entire surface of the ingot metal member in consideration of processability and the like.

The sintered metal layer of (1) can be formed by, e.g., uniformly dispersing a sintered metal powder on the surface of the ingot metal plate, and heating and pressurizing the resultant. The material of the sintered metal layer may be iron, copper and iron, stainless steel, or copper. The materials of the ingot metal member and the sintered metal layer are preferably be the same or similar in order to improve close adhesion. When the material of the sintered metal layer is a copper-based or a copper-iron-based sinter, the ingot metal member is preferably plated with copper in advance to enhance close adhesion. A component that contains lead such as lead bronze is preferably not used for the purpose of environmental preservation.

When a sintered metal layer is provided, molten resin enters into the concavities and convexities of the sintered metal layer during injection molding. Since molten resin is made to flow at high speed and high pressure during injection molding, the resin can enter deeply into the concavities and convexities (pores) in the porous sintered metal layer due to the shearing force, even when an aromatic PEK resin is used as the base resin. As a result, the resin layer 81d and the ingot metal member 81c can firmly and closely adhere via the sintered metal layer.

The chemical surface treatment of (2) is preferably (a) a treatment by which very small concavo-convex shapes are formed in the joining surface, or (b) a treatment by which a joining film for chemically reacting with the resin layer is formed on the joining surface. Endowing the joining surface with very small concavo-convex shapes increases the true joining surface area, improves the close-adhesive strength between the resin layer and the ingot metal member, and facilitates the transfer of heat in the resin layer to the ingot metal member. Also, interposing a joining film for chemically reacting with the resin layer on the joining surface improves the close-adhesive strength between the resin layer and the ingot metal member, eliminates micro gaps between the resin layer and the ingot metal member, and facilitates the transfer of heat in the resin layer to the ingot metal member.

As specific examples of the chemical surface treatments, it is possible to use the same as those used in the composite plain bearing described above. Since molten resin flows in at high speed and high pressure when the resin layer 81d is formed by injection molding, the resin can deeply enter by shearing force into the very small concavities and convexities having a concavity pitch of several nanometers to several tens of micrometers. Close-adhesive strength between the ingot metal member 81c and the resin layer 81d can thereby be ensured. Also, the very small concavo-convex shapes formed by chemical surface treatment are different from shapes obtained by simple mechanical roughening, have a complex three-dimensional porous structure, and therefore readily demonstrate an anchoring effect and can provide firm close adhesion.

Among chemical surface treatments, special surface treatments such as AMALPHA treatment produced by MEC Co., Ltd. and TRI treatment produced by Toa Denka KK are suitable for aluminum and copper. Accordingly, when these treatments are carried out, at least the treatment surface of the ingot metal member is preferably aluminum or copper. For example, when a cold-rolled steel plate is used, a copper-plating treatment is preferably used when a surface treatment is to be carried out.

Examples of the treatment (3) for mechanically roughening the joining surface to form concavo-convex shapes include shot blasting, sand blasting, tumbling, and machining.

The shearing close-adhesive strength between the ingot metal member and the resin layer is preferably 2 MPa or more in order to obtain sufficient close-adhesive strength against frictional force during use. The shearing close-adhesive strength is preferably 3 MPa or more in order to further increase the safety factor. In addition to performing the treatments of (1) to (3) noted above, it is also possible to form grooves or perform other physical peeling countermeasures in the joining surface on which the resin layer is to be formed in order to further enhance the shearing close-adhesive strength between the ingot metal member and the resin layer.

The resin composition for forming the resin layer can be obtained by using the aromatic PEK resin as the base resin, and blending therewith glass fibers, carbon fibers, aramid fibers, whiskers, or another fibrous filler in a dispersed state. The mechanical strength of the resin layer can thereby be further enhanced. In the particular case of the cradle guide variable capacity axial piston pump of the present invention, the resin layer is thin, i.e., a thickness of 0.1 to 0.7 mm and the enhancement to mechanical strength is desirable.

In addition to a fibrous filler, it is also possible to add a PTFE resin, graphite, molybdenum disulfide, and other solid lubricants, and calcium carbonate, calcium sulfate, mica, talc, and other inorganic fillers. Blending a solid lubricant noted above reduces friction even in conditions in which there is no lubricant or the lubricating oil has become diluted, and seizing resistance can be enhanced. Also, adding an inorganic filler noted above makes it possible to enhance creep resistance.

The fibrous filler, inorganic solid lubricant (graphite, molybdenum disulfide, and the like), and inorganic fillers have the effect of reducing the molding shrinkage factor of the aromatic PEK resin. Accordingly, there is also an effect in which internal stress in the resin layer is suppressed during insert molding with the ingot metal member.

Figure 14:
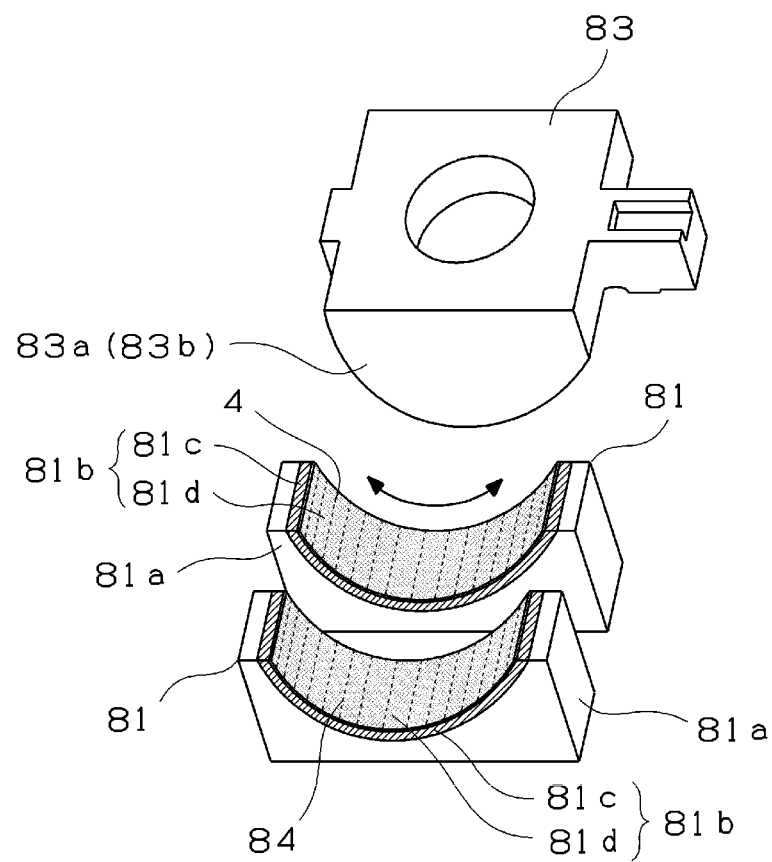
FIG. 14 is a perspective view showing another example of a cradle guide.

FIG. 14 shows a cradle guide in a mode having a resin layer composed of a resin composition to which a fibrous filler has been added. FIG. 14 is a perspective view showing the cradle guide (in which a fibrous filler has been added to the resin layer). The cradle guide 81 has the same configuration as that in FIG. 11, except that a fibrous filler 84 has been added to the resin layer 81d.

When forming the resin layer by injection molding, the melt flow direction of the resin composition is preferably adjusted to thereby cause the (lengthwise direction of the) fibrous filler 84 to be oriented at an intersecting angle of 45 degrees or more and as near to a right angle as possible with respect to the sliding direction (the arrow in the drawing) of the cradle guide 81. A fibrous filler is preferably added to enhance the mechanical strength of the resin layer 81d, but since the end parts of the fibers in the fibrous filler are edge shaped, the cradle 83, which is the counterpart material, is readily physically damaged by the end parts of the fibers due to abrasion, and the coefficient of friction is not liable to be stable. Orienting the (lengthwise direction of the) fibrous filler so as to intersect the sliding direction of the cradle guide at 45 to 90 degrees causes the edges of the two ends of the fibers to face 45 to 90 degrees with respect to the sliding direction. Abrasive damage to a counterpart material due to the edges of the two ends of the fibers can thereby be reduced and the friction coefficient can be stabilized. The nearer the orientation of the fibrous filler is to 90 degrees, the lesser the abrasive damage will be due to the edges of the fibers, and such is preferred in that the friction coefficient is also stabilized. Particularly preferred is 80 to 90 degrees. The orientation of the fibrous filler may be disorganized in the gate part and weld part during injection molding, but the percentage thereof is low and has no effect.

The average fiber length of the fibrous filler is preferably 0.02 to 0.2 mm. When the average fiber length is less than 0.02 mm, sufficient reinforcement effect cannot be obtained, and creep resistance and abrasion resistance are liable to be unsatisfactory. When the average fiber length exceeds 0.2 mm, the thin moldability is degraded because the ratio of fiber length to layer thickness of the resin layer is increased. In the particular case of insert molding to a resin thickness of 0.2 to 0.7 mm, thin moldability is inhibited when the fiber length exceeds 0.2 mm. The average fiber length is preferably 0.02 to 0.1 mm in order to further enhance stability of thin molding.

Among fibrous fillers, carbon fibers are preferably used. Carbon fibers have strong orientation in the melt flow direction of the resin when the resin layer is molded. In the particular case that relatively short and narrow-diameter carbon fibers are selected, the edges of at the two ends of the carbon fibers may align with the sliding direction of the cradle guide when the direction of orientation is less than, e.g., 45 degrees, the cradle as the counterpart material may be damaged. Accordingly, in order to improve durability and stabilize sliding torque at a low level when short narrow carbon fibers are used, it is very advantageous to set the flow direction of the molten resin to be a right angle or nearly a right angle to the sliding direction of the cradle guide when the resin is injection molded, and cause the lengthwise direction of the fibers to be oriented so as to be 45 to 90 degrees with respect to the sliding direction of the cradle guide.

The carbon fibers to be used in the cradle guide may be pitch or PAN carbon fibers sorted from a starting material, but PAN carbon fibers, which have a high modulus of elasticity, are preferred. The baking temperature is not particularly limited, but a carbonized product baked at about 1000 to 1500° C. is preferred over a product baked at a high temperature of 2000° C. or higher to produce a graphitized (black lead) product, because the counterpart material is not likely to be abrasively damaged even under high PV.

The average fiber diameter of the carbon fibers is 20 μm or less, and preferably 5 to 15 μm. Extreme pressure is generated when thick carbon fibers exceeding this range are used and such carbon fibers are therefore not preferred in that the effect of improving load resistance is poor, and when the cradle as the counterpart material is an aluminum alloy, an unquenched steel material, or the like, abrasive damage to the counterpart material is increased. The carbon fibers may also be chopped fibers or milled fibers, but in order to achieve stable thin moldability, milled fibers having a fiber length of less than 1 mm are preferred.

Commercially available examples of the carbon fibers that may be used in the cradle guide are the same as those used in the composite plain bearing described above.

The resin composition for forming the resin layer preferably has the above-described aromatic PEK resin as a base resin, and additionally contains an above-noted carbon fiber, and a PTFE resin, which is a solid lubricant, as essential components.

Examples of PTFE resins and commercially available products thereof that may be used in the cradle guide are the same as those used in the composite plain bearing described above.

Well-known additives for resins may be added to the resin composition in amounts that do not inhibit the effects of the present invention. Examples of these additives include: boron nitride and other friction characteristics improvers; carbon powder, iron oxide, titanium oxide, and other colorants; and graphite, metallic oxide powders, and other thermal conductivity improvers.

The resin composition for forming the resin layer preferably contains an aromatic PEK resin as the base resin, and 5 to 30 vol % of carbon fiber and 1 to 30 vol % of PTFE resin as essential components. The remainder excluding these essential components and other additives is an aromatic PEK resin. When this blend ratio used, deformation and abrasion of the resin layer is low, aggression against the counterpart material is low, and resistance to oil and the like is enhanced, even in high PV conditions. The carbon fiber is more preferably 5 to 20 vol %, and the PTFE resin is more preferably 2 to 25 vol %.

When the blend ratio of carbon fiber exceeds 30 vol %, melt fluidity is dramatically reduced, thin molding becomes difficult, and abrasive damage is liable to occur when the cradle as the counterpart material is an aluminum alloy, an unquenched steel material, or the like. Also, when the blend ratio of carbon fiber is less than 5 vol %, the effect of reinforcing the resin layer is poor, and it may not be possible to obtain sufficient creep resistance and abrasion resistance.

When the blend ratio of the PTFE resin exceeds 30 vol %, abrasion resistance and creep resistance are liable to be reduced below a required level. When the blend ratio of the PTFE resin is less than 1 vol %, the effect of imparting required lubricity to the composition is poor, and sufficient sliding characteristics may not be obtainable.

Means for mixing and kneading the various starting materials described above is not particularly limited, and it is possible to dry mix only the powder stating materials using a Henschel mixer, a ball mixer, a ribbon blender, a Lodige mixer, an ultra-Henschel mixer, or the like, and then melt-knead the mixture using a twin-screw extruder or other melt extruder to obtain molding pellets. The filler may be added using a side feeder when the mixture is melt-kneaded in the twin-screw extruder or the like. The use of injection molding produce excellent precision moldability, manufacturing efficiency, and other advantages. It is also possible to use an annealing process or other process to improve physical properties.

It is preferred that the resin composition for forming the resin layer have a melt viscosity of 50 to 200 Pa·s at a resin temperature of 380° C. and a shear rate of 1000 $s^{-1}$. When the melt viscosity is within this range, precision molding is made possible, the fibrous filler can be oriented at a predetermined angle, and thin insert molding of 0.1 to 0.7 mm can be smoothly performed on the surface of the ingot metal plate. When the melt viscosity is less than the predetermined range or exceeds the predetermined range, precise moldability is not reliably obtained, and the fibrous filler is not readily oriented at a predetermined angle. Making thin insert molding possible and making machining unnecessary after insert molding facilitates manufacture and reduces manufacturing costs.

It is preferred that an aromatic PEK resin having a melt viscosity of 130 Pa·s or less in the stated conditions be used in order to bring the melt viscosity to 50 to 200 Pa·s at a resin temperature of 380° C. and a shear rate of 1000 $s^{-1}$. Examples of such an aromatic PEK resin includes VICTREX PEEK (90P and 90G) manufactured by Victrex plc. Using such an aromatic PEK resin facilitates entry of resin material, during injection molding, into very small concavo-convex shapes having a concavity pitch of several nanometers to several tens of nanometers formed by a chemical surface treatment, facilitates entry of the resin material into the concavities and convexities (pores) of the sintered metal layer, and makes firm close adhesion possible.

The cradle guide for a variable capacity axial piston pump and the variable capacity axial piston pump of the present invention were described above, but the embodiments of the present invention are not limited thereby.

The sliding nut and sliding screw device of the present invention are described below.

Figure 15:
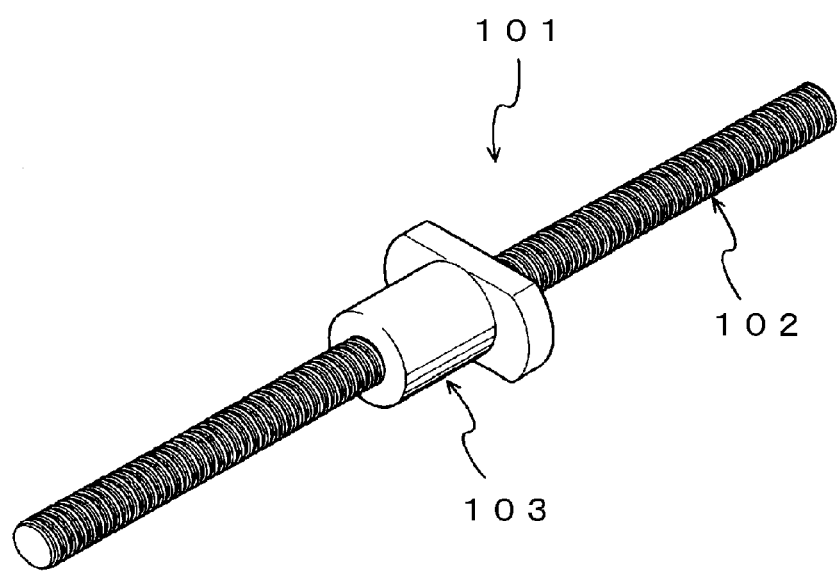
FIG. 15 is a perspective view of a sliding screw device.
Figure 16:
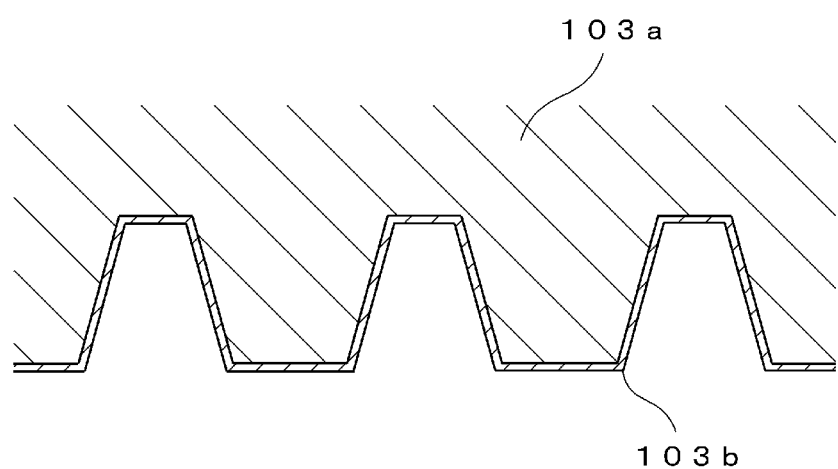
FIG. 16 is a cross-sectional view in the axial direction of the sliding nut.

An example of the sliding screw device of the present invention will be described with reference to FIGS. 15 and 16. FIG. 15 is a perspective view of a sliding screw device, and FIG. 16 is a cross-sectional view in the axial direction of the sliding nut. The sliding screw device 101 of the present invention is composed of a screw shaft 102 and the sliding nut 103 of the present invention that threadedly engages the threading grooves of the screw shaft 102 and that moves in a relative fashion while sliding along the screw shaft. The rotational motion of the screw shaft 102 is converted to the rectilinear motion of the sliding nut 103. Additionally, the sliding nut 103 can be made to rotate in the same position and thereby be used for imparting rectilinear motion to the screw shaft 102.

As the screw shaft 102, it is possible to use a metal shaft compose of an aluminum alloy, stainless steel, carbon steel, or other iron-based metals plated with zinc, nickel, steel chromium, or the like; or a resin shaft composed of a polyimide resin, a phenol resin, or the like. Stainless steel, aluminum alloys, or other corrosion resistance metals are preferred in that they have high strength and can be used under high load, and are also advantageous in that they do not rust and a rust-preventive treatment can be omitted. Corrosion resistance metals which have excellent durability and can ensure dimensional precision are most preferred in the present invention.

The method for manufacturing the screw shaft 102 may be any method, including rolling, cutting, and grinding. The surface roughness of surface in contact with the screw shaft is preferably as low as possible when consideration is given to abrasion resistance and other sliding characteristics under high-load conditions. When the surface roughness of the screw shaft is 0.1 µm Ra or less, abrasion is very low in that the sliding nut undergoes less cutting due to convexities in the screw shaft surface. A surface roughness of 0.05 µm Ra or less is particularly optimal.

The screw shaft 102 can be used without lubrication. Oil, grease, or other lubricant may be used in the sliding part between the screw shaft 102 and the sliding nut 103 when emphasis is to be placed on low-friction characteristics rather than being maintenance free. In this case, it is preferred that rectilinear grooves be formed in the axial direction in the female threading part of the sliding nut as a countermeasure so that abrasion powder is retained and abrasive wear is inhibited. Lubricating with oil or grease makes it possible to withstand even higher loads and to ensure high-precision rotation stability.

The nut main body 103a of the sliding nut is composed of an ingot metal, as shown in FIG. 16, and a resin layer 103b composed of a resin composition in which a later-described synthetic resin is used as the base resin is formed as the threading groove part on the surface of the female threading part in the nut main body 103a for threadedly engaging on the screw shaft. The female threading part is a portion of the nut main body 103a and is formed in the inside diameter part of the nut main body 103a. The resin layer 103b, which is a threading groove part, is formed so as to cover the surface of the female threading part. The resin layer 103b, which is a threading groove part, makes sliding contact directly with the screw shaft 102 (see FIG. 15). The resin layer 103b may be formed at least on the surface of the female threading part, or may also be formed on other surfaces of the nut main body 103a.

The resin layer 103b bites into the surface roughness of the ingot metal of the nut main body 103a, whereby the resin layer 103b and the nut main body 103a closely adhere to each other. Furthermore, the true joining surface area between the resin layer 103b and the nut main body 103a is increased, and since there are no gaps in the joining face between the resin layer and the female threading part (ingot metal), and heat in the resin layer 103b is readily transmitted to the nut main body 103a.

Examples of the shapes of the threading part that may be used include: miniature threading, metric coarse threading, metric fine threading, unified coarse threading, unified fine threading, and other triangular threading; 30-degree trapezoidal threading, metric trapezoidal threading, and other trapezoidal threading; round threading and, gothic arc-shaped threading; and all other threading shapes. Single threading, double threading, or multiple threading may also be used.

The inside diameter (the convex part to the nut inside diameter) of the smallest part of the nut main body 103a is preferably less than the outside diameter (the convex part to the shaft outside diameter) of the largest part of the screw shaft. In the sliding nut of the present invention, the female threading part of the nut main body 103a itself is made of an ingot metal, the resin layer 103b is formed thinly along the surface thereof, and the above-noted shape can therefore be realized. This shape makes it possible for the nut main body to receive the load from the screw shaft, and the tooth flank of the female threading part of the nut can be prevented from fracturing or otherwise being damaged, even in an unforeseen high load caused by an impact load or the like. As a result, the nut does not become dislodged from the screw shaft and safety during usage can be enhanced.

The material of the ingot metal constituting the nut main body is preferably iron, aluminum, aluminum alloy, copper, or copper alloy. Using these materials makes it possible to ensure required thermal conductivity and load resistance in the ingot metal nut main body, facilitates heat dissipation from the ingot metal nut main body to the exterior, and allows use even under a high load.

Examples of the iron include carbon steel for general structures (SS400 or the like), carbon steel for mechanical structures (S45C or the like), and stainless steel (SUS303, SUS316, or the like), and these irons may be plated with zinc, nickel, copper, or the like.

Examples of the aluminum include A1050 and A1100, examples of the aluminum alloy include A2017, A2024, A5056, and A6061. A2017 and A2024 are preferred because cutting processability is excellent. Also, an aluminum alloy die cast (ADC12 or the like) and an aluminum alloy casting (AC4B or the like) may be used. An alumite-treated article may be used in order to enhance the corrosion resistance and abrasion resistance of the aluminum.

The copper may be C1100 or the like, and the copper alloy may be C3604 or the like. C6801, C6802, or the like, which have a lead content of 0.1% or less and a cadmium content of 0.0075% or less, are preferred from the viewpoint of cutting processability and environmental concerns. It is also possible to use a copper alloy casting (CAC406 or the like).

Clearance is required between the mold and the nut main body in the step for inserting the ingot metal nut main body into a mold and injection molding a resin. For example, when nut main body is inserted in the mold and the resin is insert molded on the inside diameter, the nut main body is stretched by injection molding pressure to the outside diameter side by an amount commensurate to the clearance, and there is a possibility of fracturing when the stretching of ingot metal of the nut main body is insufficient. Accordingly, the stretching of the ingot metal is preferably 5% or more, and the material is preferably other than an aluminum alloy die cast, an aluminum alloy casting, and a coppery alloy casting.

The thermal conductivity of the ingot metal of the nut main body is preferably 50 W/(m·K) or greater. Using a material having a thermal conductivity of 50 W/(m·K) or greater facilitates heat dissipation from the resin layer to the ingot metal nut main body, and from the ingot metal nut main body to the exterior, and use in higher loads is made possible. Examples of materials having a thermal conductivity of 50 w/(m·K) or greater include the above-described aluminum, aluminum alloy, copper, and copper alloy. The higher the thermal conductivity of the ingot metal nut is, the more readily frictional heat is dissipated, and it is therefore preferred that the thermal conductivity be 100 W/(m·K) or greater.

The joining face of the ingot metal nut main body to the resin layer is preferably roughened to form concavo-convex shapes using a shot blast or a tumbler, or by machining or the like in order to increase close adhesion with the resin layer during insert molding. The surface roughness after doing so is preferably Ra 4 µm or higher. The surface of the ingot metal nut main body may also undergo metal plating or other surface treatment.

The joining face of the ingot metal nut main body to the resin layer is preferably subjected to a chemical surface treatment in order to increase close adhesion between the ingot metal nut main body and the resin layer. The chemical surface treatment is preferably (1) a treatment by which very small concavo-convex shapes are formed on the joining face, or (2) a treatment in which a joining film that chemically reacts with the resin layer is formed on the joining face.

Endowing the joining face with very small concavo-convex shapes increases the true joining surface area, improves close adhesive strength between the resin layer and the ingot metal nut main body, and facilitates the transmission of heat in the resin layer to the ingot metal nut main body. Also, interposing a joining film that chemically reacts with the resin layer on the joining face improves the close adhesive strength between the resin layer and the ingot metal nut main body, eliminates micro-gaps between the resin layer and the ingot metal nut main body, and facilitates the transmission of heat in the resin layer to the ingot metal main body.

Specific examples of these chemical surface treatments that may be used are the same as those used for the composite plain bearing described above. When the resin layer is to be formed by injection molding, a resin material is made to flow at high speed, so the resin material can enter deeply into the very small concavo-convex shapes having a concavity pitch of several nanometers to several tens of micrometers by shearing force. The close-adhesive strength between the ingot metal nut main body and the resin layer can thereby be ensured. Also, the very small concavo-convex shapes formed by chemical surface treatment are different from shapes obtained by simple mechanical roughening, have a complex three-dimensional porous structure, and therefore readily demonstrate an anchoring effect and can provide firm close adhesion.

Among chemical surface treatments, special surface treatments such as AMALPHA treatment produced by MEC Co., Ltd. and TRI treatment produced by Toa Denka KK are suitable for aluminum and copper. Accordingly, when these treatments are carried out, at least the surface of the ingot metal nut main body is preferably aluminum or copper.

The shearing close-adhesive strength between the ingot metal nut main body and the resin layer is preferably 2 MPa or more. In this range, sufficient close-adhesive strength with respect to frictional force during usage can be obtained, and the resin layer does not peel away from the ingot metal nut main body even when used under a high load. The shearing close-adhesive strength is preferably 4 MPa or greater in order to further enhance the safety factor. The physical securing part, mechanical surface-roughening treatment, chemical surface-roughening treatment, and other means for improving close-adhesive strength are preferably selected, as appropriate, and used in combination so as that the shearing close-adhesive strength noted above can be ensured.

The thickness of the resin layer is preferably 0.1 to 1.5 mm. When the resin thickness is less than 0.1 mm, the durability, i.e., the service life during long-term usage is liable to be reduced. On the other hand, when the resin thickness exceed 1.5 mm, friction-induced heat has difficultly escaping from the friction surface to the nut main body side, and the friction surface temperature is increased. Also, the amount of load-induced deformation is greater, and the true contact surface area on the friction surface is liable to be increased, frictional force and friction-induced heat are liable to be higher, and abrasion is liable to be greater. Incidentally, the resin thickness is determined by the inside diameter dimension of the nut.

The resin thickness is preferably 0.2 to 0.7 mm when consideration is given to dissipation of friction-induced heat to the nut main body. Even when the required thickness is obtained by injection molding, it is also possible finish the resin to a required thickness by machining after injection molding (insert molding).

In the resin composition for forming the resin layer, the base resin is an injection-moldable synthetic resin. The synthetic resin is preferably one having excellent lubrication characteristics. A synthetic resin having high heat resistance is preferred so that the sliding nut can be used in locations of high ambient temperature. Examples of such a synthetic resin include an aromatic PEK resin, polyacetal (POM) resin, PPS resin, injection-moldable thermoplastic PI resin, polyamide imide (PAI) resin, polyamide (PA) resin, and injection-moldable fluororesin. These synthetic resins may be used alone, or in a combination of two or more as a polymer alloy.

Among these synthetic resins, an aromatic PEK resin, thermoplastic PI resin, or PPS resin is preferably used. Using these synthetic resins as the base resin of a resin composition for forming the resin layer results in a sliding nut having excellent heat resistance, oil resistance, creep resistance, load resistance, and friction abrasion characteristics. The close adhesive strength with the nut main body composed of an ingot metal is high and there is no concern of peeling away from the nut main body.

Aromatic PEK resin is a crystalline thermoplastic resin having a melting point of 340° C., a glass transition point of 143° C., and a continuous usage temperature of 260° C.; has excellent heat resistance, oil and chemical resistance, creep resistance, load resistance, abrasion resistance, sliding characteristics in addition to have high mechanical properties at high temperature, excellent fatigue resistance characteristics and impact resistance, and good moldability. Therefore, it is suitable as a base resin for a sliding nut of a sliding screw device.

Specific examples of the aromatic PEK resin that may be used in this sliding nut are the same as those used in the composite plain bearing described above.

Thermoplastic PI resin is a crystalline thermoplastic resin having a melting point of 388° C., a glass transition point of 250° C., and a continuous usage temperature of 240° C.; has excellent heat resistance, oil resistance, load resistance, friction abrasion characteristics, and other characteristics; and is therefore suitable as a base resin for a sliding nut of a sliding screw device. Since the in-mold crystallization rate during injection molding is low, the molded article is non-crystalline, but the degree of crystallization can be increased by heat treatment. Commercially available examples of the thermoplastic PI resin that can be used in the present invention include Aurum (PD450, PD6200, and the like) manufactured by Mitsui Chemicals, Inc.

PPS resin is a crystalline thermoplastic resin having a melting point of 280° C., a glass transition point of 88° C., and a continuous usage temperature of 240° C.; has very high rigidity and excellent heat resistance, dimensional stability, abrasion resistance, sliding characteristics, high fluidity, and other characteristics; and is therefore suitable as a base resin for a sliding nut of a sliding screw device. In terms of molecular structure, types of PPS resin include crosslinked, semi-crosslinked, normal chain, and branched, but a PPS resin may be used in the present invention without limitation to molecular structures or these molecular weight. Commercially available PPS resins that may be used in the present invention include #160 and B-063 manufactured by Tosoh Corp., and T4AG and LR-2G manufactured by DIC Corp.

The resin composition for forming the resin layer preferably does not contain glass fibers, carbon fibers, whiskers, or other fibrous inorganic filler. When the resin layer contains a fibrous filler, the end parts of the fibers form edges that are liable to abrasively damage the counterpart screw shaft when the sliding nut moves back and forth in a relative manner while sliding on the screw shaft in accompaniment with the rotation of the screw shaft, the end parts of the fibers undergo repeated stress when the sliding nut moves back and forth and the resin is liable to undergo fatigue abrasion, and there are other drawbacks. Using a configuration in which a fibrous filler is not included makes it possible to eliminate these concerns.

The resin composition for forming the resin layer preferably contains a PTFE resin. Including a PTFE resin ensures lower friction and a reduction in friction-induced heat, and has excellent friction abrasion characteristics even under a high load. A molding powder obtained by suspension polymerization, a fine powder obtained by emulsification polymerization, or a recycled PTFE may be used as the PTFE resin. A recycled PTFE is a heat-treated (having a heat history) powder, a powder irradiated with a γ-ray or an electron beam, or the like. Examples of such types include: a powder obtained by heat treating a molding powder or a fine powder, or a powder obtained by further irradiating these powders with γ-rays or an electron beam; a powder obtained by pulverizing a molded article composed of a molding powder or a fine powder, or a powder obtained by thereafter irradiating these powders with γ-rays or an electron beam; and a powder obtained by irradiating a molding powder or a fine powder with γ-rays or an electron beam.

A high-molecular-weight molding powder or a recycled PTFE molding powder (heat-treated powder, powder irradiated with γ-rays or electron beam, or the like) is preferred in order to improve the abrasion resistance of the resin layer. Among molding powder recycled PTFE types, a powder irradiated with γ-rays, an electron beam, or the like is more preferably used because it does not aggregate and does not form fibrils at the injection molding temperature of the resin, has internal lubricating effect, and is capable of stabilizing and improving fluidity of a resin composition.

Examples of commercially available PTFE resins that may be used in the sliding nut are the same as those used in the composite plain bearing described above.

The resin composition forming the resin layer preferably contains graphite. Including graphite enhances friction abrasion characteristics. Also, since thermal conductivity is high, frictional heat is more readily dissipated. Graphite can be roughly categorized into natural graphite and manmade graphite, and may be further classified as scaly, granular, spherical, or other form, and any of these may be used. Scaly graphite is preferred in order to increase the elasticity of the resin composition, to enhance abrasion resistance and creep resistance, and to furthermore obtain stable low-friction characteristics.

It is particularly preferred that the resin composition for forming the resin layer contain 10 to 30 vol % PTFE and 2 to 10 vol % graphite with respect to the entire resin composition without including a fibrous filler. Using this blend ratio results a low coefficient of friction, lesser deformation of the resin layer, lesser abrasion and damage to the counterpart screw shaft, and increased resistance to oil and the like.

When the blend ratio of the PTFE resin exceeds 30 vol %, abrasion resistance and creep resistance are reduced below the required level, and the close-adhesive strength of the nut main body and the melt fluidity are liable to be dramatically reduced. Also, when the blend ratio of the PTFE resins is less than 10 vol %, the effect of imparting the low-friction characteristics and abrasion characteristics to the composition is poor, and it may not be possible to obtain sufficient sliding characteristics.

When the blend ratio of graphite exceeds 10 vol %, abrasion resistance, friction characteristics, and resistance to damage to the counterpart screw shaft are reduced below the required level, and melt fluidity is dramatically reduced, and molding difficulty is liable to occur. Also, when the blend ratio of the graphite is less than 2 vol %, the effect of imparting abrasion resistance, creep resistance, and thermal conductivity to the composition is poor, and it may not be possible to obtain sufficient sliding characteristics.

Well-known additives for resins may be added to the resin composition in amounts that do not inhibit the effects of the present invention. Examples of these additives include: boron nitride, molybdenum disulfide, tungsten disulfide, and other friction characteristics improvers; carbon powder, metallic oxide powders, and other thermal conductivity improvers; and carbon powder, iron oxide, titanium oxide, and other colorants. Additional examples include: calcium carbonate, calcium sulfate, mica, talc, and other granular inorganic fillers; and organic fillers and other abrasion resistance improvers that do not melt at the injection molding temperature of the resin such as thermoplastic PI resin, fully aromatic polyester resins, and aramid fibers.

It is preferred that the resin composition be adjusted to a melt viscosity range of 50 to 200 Pa·s at a resin temperature of 380° C. and a shear rate of 1000 $s^{-1}$ to thereby allow thin insert molding with a resin layer thickness of 0.1 to 1.5 mm to be smoothly carried out on the surface of the nut main body.

Means for mixing and kneading the various starting materials described above is not particularly limited, and it is possible to dry mix only the powder stating materials using a Henschel mixer, a ball mixer, a ribbon blender, a Lödige mixer, an ultra-Henschel mixer, or the like, and then melt-knead the mixture using a twin-screw extruder or other melt extruder to obtain molding pellets. The filler may be added using a side feeder when the mixture is melt-kneaded in the twin-screw extruder or the like. It is also possible to use an annealing process or other process to improve physical properties. The sliding nut of the present invention is injection molded by insert molding a resin layer onto the nut main body using the molding pellets. Specific examples thereof that may be used include the manufacturing method described in patent document 10, and a manufacturing method in which a resin layer is injection molded onto the nut main body and the female threading is given a predetermined shape by machining.

In another mode of the sliding nut, the nut main body may be made of a sintered metal. In this case, the configuration is the same as the sliding nut described above, except that the material of the nut main body is changed.

The resin layer bites into the pores of the sintered metal of the nut main body and the resin layer and nut main body closely and firmly adhere to each other. In the particular case that injection molding is carried out by insert molding, the resin layer bites deeply into the concavo-convex shapes in the surface of the nut main body (sintered metal) during injection molding and increases the true joining surface area. Therefore, the close-adhesive strength between the resin layer and the nut main body is enhanced.

The material of the sintered metal constituting the nut main body may be iron, copper and iron, copper, stainless steel, or the like. Using these materials can ensure required thermal conductivity and load resistance in the sintered metal nut main body, facilitates heat dissipation from the resin layer to the sintered metal nut main body, and from the sintered metal nut main body to the exterior, and use in even high loads is made possible.

Since the close adhesion between the resin layer and the nut main body can increased, a sintered metal having iron as a main component is preferably, and an iron sintered metal having a copper content of 10 wt % or less is more preferred. Copper is inferior to iron in terms of close adhesion (adhesiveness) with the resin layer, and the copper content is therefore preferably 10 wt % or less. The copper content is even more preferably 5 wt % or less.

There are cases in which oil or the like is deposited on or enters into the sintered metal constituting the nut main body, and since oil residue that dissolves or gasifies during injection molding of the resin layer is present in the boundary, close adhesion between the resin layer and the sliding nut main body is liable to be reduced. Accordingly, the use of a sintered metal that is not impregnated with oil is preferred. Also, when oil is used in the sintered metal molding or recompression (sizing) step, the sintered metal is preferably rendered devoid of oil by washing with a solvent or otherwise removing the oil.

The density of the sintered metal (sintered compact) in the nut main body is preferably a theoretical density ratio of material of 0.7 to 0.9. The theoretical density ratio of material is the ratio of the density of the nut main body where 1 is the theoretical density ratio of material (the density when porosity is 0%). When the theoretical density ratio is less than 0.7, the adjusted strength of the sintered metal is low, and the sintered metal is liable to fracture under the pressure of injection molding during insert molding. When the theoretical density ratio exceeds 0.9, the concavities and convexities become smaller, the surface area and anchoring effect are reduced, and close adhesion with the resin layer is reduced. The theoretical density ratio of material is more preferably 0.72 to 0.84.

Steam treating a sintered metal having iron as a main component has the effect of removing oil, deposits, and the like unintentionally deposited on or permeated into the sintered surface during the molding or recompression (sizing) step, and variability in close adhesion with the resin layer can therefore be reduced and stabilized. Also, rust resistance can be imparted to the nut main body. The conditions for the steam treatment are not particularly limited, but a common method is to blow steam heated to about 500° C.

Examples of the method for forming a resin layer include coating by dipping and injection molding. Injection molding in which a resin layer is overlaid on the nut main body, that is, injection molding for insert molding a resin layer onto the nut main body is preferred when consideration is given to threading dimensional precision, close adhesion between the resin layer and the nut main body, and ease of manufacture.

A chemical surface treatment by which very small concavo-convex shapes are formed on the sintered metal main nut body on the face joined to the resin layer is preferably carried out in order to increase close adhesion between the resin layer and the sintered metal nut main body. It is possible to use the same chemical surface treatments as those used for the sliding nut having a nut main body made of a ingot metal. In this case, the joining face to be subjected to a chemical surface treatment includes, in microscopic terms, the surfaces of the concavities and convexities constituting the pores of the sintered metal.

When the resin layer is to be formed by injection molding, a resin material is made to flow at high speed, so the resin material can flow by shearing force deeply into the pores of the sintered metal and into the very small concavo-convex shapes having a concavity pitch of several nanometers to several tens of micrometers. Also, thinly (0.1 to 1.5 mm) insert molding a resin layer on the surface of the female threading part of the inside diameter part of the nut main body composed of a sintered metal having high dimensional precision makes it possible to obtain a sliding nut having high dimension precision.

EXAMPLES

Examples of the composite plain bearing of the present invention are described below.

Examples A1 to A21, Comparative Examples A1 to A2, Reference Examples A1 to A6

The ingot metal plates used in these examples, comparative examples, and reference examples are summarized in Table 1. The ingot metal plate B was provided with 11 round countersunk screw-shaped physical securing parts having a diameter of ϕ2 mm (FIG. 2(b)). In Table 1, the acid processing (nitric acid) was carried out by immersing the ingot metal plate in an aqueous solution of 20% nitric acid at room temperature (about 20 to 30° C.) for 30 seconds to one minute. The alkali treatment (sodium hydroxide) was carried out by immersing the ingot metal plate in an aqueous solution of 25% sodium hydroxide at room temperature (about 20 to 30° C.) for 30 seconds to one minute. The AMALPHA treatment was carried out by immersion for one to five minutes at room temperature (about 20 to 30° C.). NMT treatment was carried out by immersion for five minutes at a temperature of 75° C. TRI treatment was carried out by immersion and energizing for one to ten minutes at a temperature of 60° C. Degrease cleansing was carried out prior to these treatments, and washing and drying were carried out after the treatments.

TABLE 1

| Ingot metal plate | Material | Chemical surface treatment | Surface roughness Ra (μm) | Physical securing part |
|---|---|---|---|---|
| A | SPCC | Acid treatment (nitric acid) | 6.5 | None |
| B | SPCC | Acid treatment (nitric acid) | 6.5 | Present |
| C | SPCC and copper plating | Toa Denka KK TRI treatment | 0.3 | None |
| D | SUS304 | Acid treatment (sulfuric acid) | 4.9 | None |
| E | A5052 | MEC Co., Ltd. AMALPHA treatment | 4.1 | None |
| F | A5052 | Taiseiplas Co., Ltd. NMT treatment | 0.8 | None |
| G | A5052 | Alkali treatment (Sodium hydroxide) | 4.3 | None |
| H | C2801 | MEC Co., Ltd. AMALPHA treatment | 0.2 | None |
| I | SPCC | None (shot blasting) | 4.5 | None |
| J | SPCC | None | 0.8 | None |
| K | A5052 | None | 0.1 | None |

Figure 8:
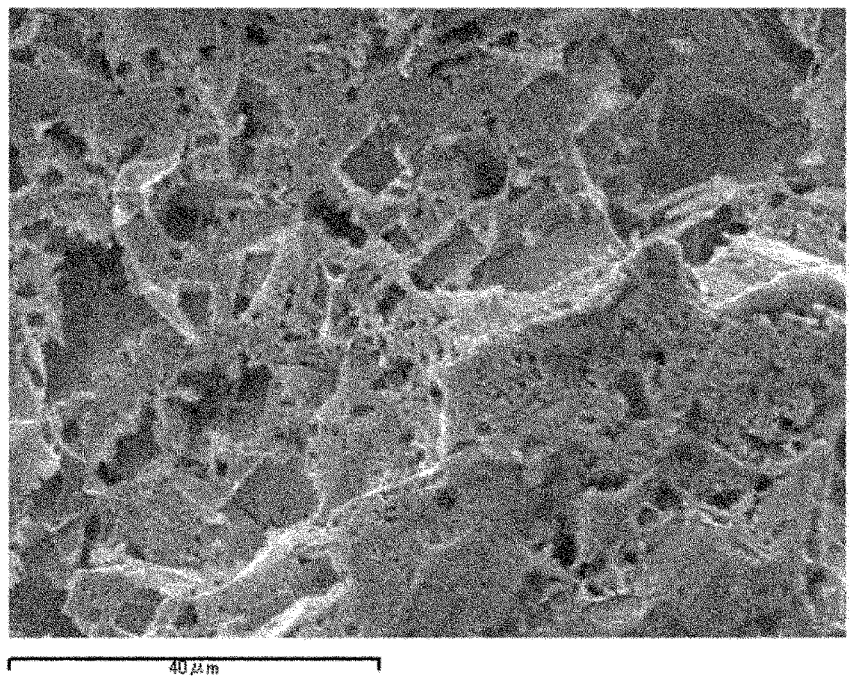
FIG. 8 is an enlarged photograph showing the acid-treated surface state of the ingot metal plate A.
Figure 9:
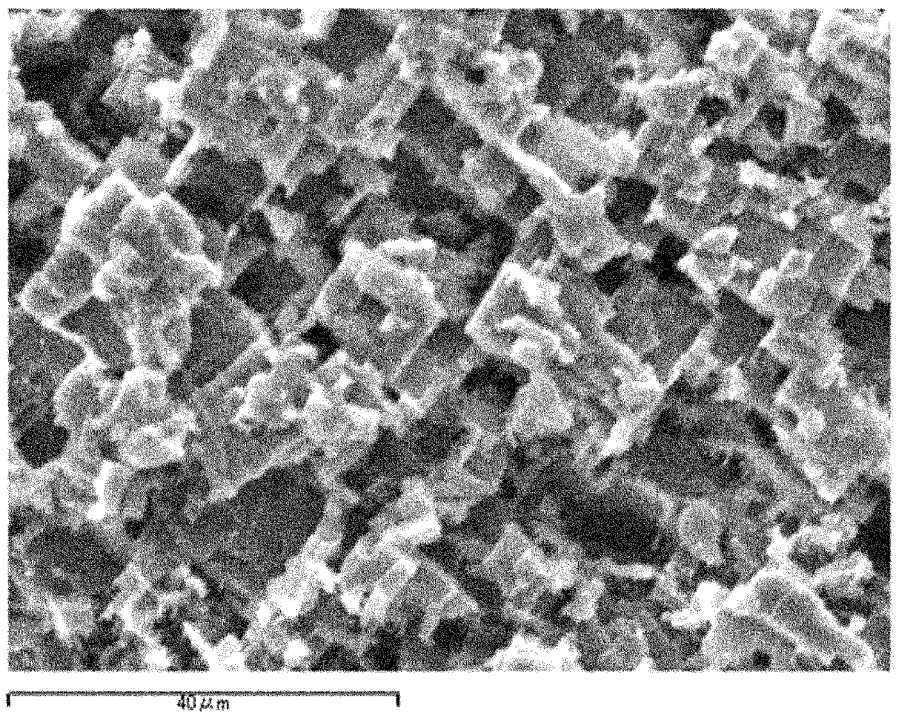
FIG. 9 is an enlarged photograph showing the AMAL-PHA-treated surface state of the ingot metal plate E.

FIG. 8 shows the state of the acid-treated surface of the ingot metal plate A, and FIG. 9 shows the state of the AMALPHA-treated surface of the ingot metal plate E.

The starting materials of the resin layers used in the examples, comparative examples, and reference examples are summarized below. The melt viscosities of the aromatic PEK resins are values measured using a capillograph manufactured by Toyo Seiki Seisaku-sho, Ltd. in a φ1 mm×10 mm capillary at a resin temperature of 380° C. and a shear rate of 1000 s$^{-1}$.

(1) Aromatic PEK resin (PEK-1): PEEK 90P (melt viscosity: 105 Pa·s) manufactured by Victrex plc.
(2) Aromatic PEK resin (PEK-2): PEEK 150P (melt viscosity: 145 Pa·s) manufactured by Victrex plc.
(3) PAN carbon fiber (CF-1): Torayca MLD-30 (average fiber length: 0.03 mm; average fiber diameter: 7 μm) manufactured by Toray Industries, Inc.
(4) PAN carbon fiber (CF-2): Besfight HTA-CMF0160-0H (fiber length: 0.16 mm; fiber diameter: 7 μm) manufactured by Toho Tenax.
(5) Pitch carbon fiber (CF-3): KRECA M-101S (average fiber length: 0.12 mm; average fiber diameter: 14.5 μm) manufactured by Kureha Corp.
(6) Pitch carbon fiber (CF-4): KRECA M-107S (average fiber length: 0.7 mm; average fiber diameter: 14.5 μm) manufactured by Kureha Corp.
(7) PTFE resin (PTFE): KTL-610 (Recycled PTFE) manufactured by Kitamura, Ltd.

The starting materials were dry-blended using a Henschel dry mixer in the blend ratios (vol %) shown in Tables 2 and 3, and the mixture was melt-kneaded using a twin-screw extruder to fabricate pellets. A cylindrical composite plain bearing (φ30 mm×φ34 mm×20 mm) for supporting a radial load such as that shown in FIG. 1 was fabricated using these pellets in the following two manufacturing steps at a resin temperature of 380° C. to 400° C. and a mold temperature of 180° C.

Manufacturing Step (1) [Resin Layer Injection Molded and then Rounding Machining]

A resin layer (105 mm×25 mm) was insert molded to a thickness of 0.2 to 1 mm on the surface of the ingot metal plates (press punched: 130 mm×45 mm×1.6 mm) in Table 1. The resin was melted and allowed to flow from the long side of the resin layer so as to form a right angle with the direction of rotation of the plain bearing. The resin layer portion was cut to 101 mm×20 mm and subjected to rounding machining to thereby fabricate a cylindrical composite plain bearing.

Manufacturing Step (2) [Injection Molding of Resin Layer onto the Rounded Ingot Metal Plate]

The ingot metal plates in Table 1 were punched out with the dimensions 101 mm×20 mm×1.6 mm using a press and were rounded, and a resin layer having a thickness of 0.4 mm was then formed by insert molding on the inside diameter to fabricate cylindrical composite plain bearings. In molding the composite plain bearings, a nine-point pin gate was provided to the bearing end face, and injection molding was carried out so that the melt flow of the resin layer was at a right angle to the direction of rotation of the plain bearing.

TABLE 2

| Starting material | Resin layer composition | | | | | | |
|---|---|---|---|---|---|---|---|
| | a | b | c | d | e | f | g |
| (1) PEK-1 | 80 | 78 | 85 | 65 | — | — | 80 |
| (2) PEK-2 | — | — | — | — | 80 | 80 | — |
| (3) CF-1 | 10 | 20 | 5 | 10 | — | — | — |
| (4) CF-2 | — | — | — | — | 10 | — | — |
| (5) CF-3 | — | — | — | — | — | 10 | — |
| (6) CF-4 | — | — | — | — | — | — | 10 |
| (7) PTFE | 10 | 2 | 10 | 25 | 10 | 10 | 10 |

TABLE 3

| Starting material | Resin layer composition | | | |
|---|---|---|---|---|
| | h | i | j | k |
| (1) PEK-1 | 65 | 88 | 60 | 80 |
| (3) CF-1 | 35 | 2 | 5 | — |
| (7) PTFE | — | 10 | 35 | 20 |

(1) Shearing Close-adhesive Strength Test

The resin layer a in Table 2 was insert molded to a thickness of 0.4 mm with the dimensions of 100 mm×25 mm onto the surface of the ingot metal plates (130 mm×45 mm×1.6 mm) in Table 1 to fabricate untreated plates. Another ingot metal plate shot blasted with an epoxy adhesive was bonded to the 25 mm×12.5 mm portion of the resin layer (the border with the remaining resin layer was cut and edged away) on the untreated plate to obtain a test piece, and a shearing close-adhesive strength test was carried out. In this test, the ingot metal plate constituting the untreated plate was fixed in place, shearing force in the horizontal direction was applied to the resin layer, a load for peeling the resin layer away from the ingot metal plate was measured, the value obtained by dividing the breaking load by the joining surface area between the resin layer and the ingot metal plate was used as the shearing close-adhesive strength, and the results are shown in Table 4. The shearing close-adhesive strength of the adhesive joining face between the untreated plate and the other ingot metal plate was greater than the shearing close-adhesive strength between the resin layer and the ingot metal plate in the untreated plate, and the adhesive joining face did not peel away during the test. The test piece of example A2 was fabricated so that two physical securing parts were located in the 25 mm×12.5 mm portion on which the resin layer was formed.

The presence of peeling abnormalities in the resin layer when the untreated plate was insert molded were checked and noted in Table 4. The test was carried out by fabricating five untreated plates, visually checking for lifting (peeling) of the resin layer, recording "x" for those that had peeling in even one location including partial lifting, and recording "◯" for those without any peeling.

TABLE 4

| | | Specifications of ingot metal plate | | | Composition of resin layer | Test results | |
|---|---|---|---|---|---|---|---|
| | | Ingot metal plate | Material | Chemical surface treatment | Physical securing part | | External appearance of untreated plate* | Shearing close-adhesive strength, MPa |
| Example | A1 | A | SPCC | Acid treatment | None | a | ◯ | 8 |
| | A2 | B | SPCC | Acid treatment | Present | a | ◯ | 10 |

TABLE 4-continued

|  |  | Specifications of ingot metal plate | | | Composition of resin layer | Test results | |
|---|---|---|---|---|---|---|---|
|  | Ingot metal plate | Material | Chemical surface treatment | Physical securing part |  | External appearance of untreated plate* | Shearing close-adhesive strength, MPa |
|  | A3 | C | SPCC + copper plating | TRI treatment | None | a | o | 8 |
|  | A4 | D | SUS304 | Acid treatment | None | a | o | 2 |
|  | A5 | E | A5052 | AMALPHA treatment | None | a | o | 19 |
|  | A6 | F | A5052 | NMT treatment | None | a | o | 6 |
|  | A7 | G | A5052 | Alkali treatment | None | a | o | 2 |
|  | A8 | H | C2801 | AMALPHA treatment | None | a | o | 14 |
|  | A9 | I | SPCC | None (shot blasting) | None | a | o | 1.5 |
| Reference example | A1 | J | SPCC | None | None | a | x | — |
|  | A2 | K | A5052 | None | None | a | x | — |

*External appearance of untreated plate -
o: No peeling abnormalities in resin layer;
x: peeling As shown in Table 4, examples A1 to A9 had no peeling abnormalities in the resin layer on the untreated plate after insert molding, and the shearing close-adhesive strength was 1.5 MPa or greater. In particular, shearing close-adhesive strength was 5 MPa or greater for examples A3, A5, A6, and A8 which underwent a special surface treatment, example A2 in which a physical securing part was provided, and example A1 in which SPCC underwent acid treatment.

(2) Seizing Resistance Test

The composite plain bearing (φ30 mm×φ34 mm×20 mm) in which the resin layers of Tables 2 and 3 are formed on the ingot metal plates of Table 1 were subjected to a seizing resistance test using an in-oil radial tester. The running-in operation was carried out for 30 minutes in the oil supply conditions noted in Table 5, oil supply was stopped, oil was drained, and the time until seizing was measured. Seizing was defined to be the time until the temperature of the outside diameter part of the bearing increased 20° C. or until the torque doubled. The seizing times are shown in Tables 6 and 7. The composite plain bearing of comparative example A2 is a plain bearing (φ30 mm×φ34 mm×20 mm) using resin alone in which only the composition a of Table 2 was injection molded.

(3) Abrasion Test

The same composite plain bearings (φ30 mm×φ34 mm×20 mm) as in the seizing resistance test were measured for the amount of abrasion after 30 minutes of operation in the oil-supply conditions of Table 5 using an in-oil radial tester. The amount of abrasion is shown in Tables 6 and 7.

TABLE 5

| Rotational speed | 3000 rpm |
|---|---|
| Load | 10 kN |
| Oil | Idemitsu Daphne Hermetic Oil PS |
| Oil temperature | 100° C. (circulating type) |
| Counterpart material | FCD600 |

(4) Melt Viscosity

Melt viscosity was measured using a capillograph manufactured by Toyo Seiki Seisaku-sho, Ltd. in a φ1 mm×10 mm capillary at a resin temperature of 380° C. and a shear rate of 1000 $s^{-1}$. The results are shown in Tables 6 and 7.

TABLE 6

| | Examples | | | | | | | | | | | |
|---|---|---|---|---|---|---|---|---|---|---|---|---|
| | A10 | A11 | A12 | A13 | A14 | A15 | A16 | A17 | A18 | A19 | A20 | A21 |
| Manufacturing step | (1) | (1) | (1) | (1) | (2) | (1) | (1) | (2) | (2) | (1) | (1) | (1) |
| Ingot metal plate | E | E | E | E | E | E | E | D | A | H | B | B |
| Resin layer | a | b | c | d | e | f | g | a | a | a | c | a |
| Resin layer thickness (mm) | 0.4 | 0.4 | 0.4 | 0.4 | 0.4 | 0.4 | 0.4 | 0.4 | 0.4 | 0.4 | 0.2 | 0.7 |
| Resin layer peeling | none | none | none | none | none | none | none | none | none | none | none | none |
| Seizing time (minutes) | 100 | 53 | 70 | >120 | 93 | 73 | 60 | 31 | 80 | >120 | 67 | 48 |
| Abrasion amount (μm) | 3 | 6 | 10 | 6 | 4 | 7 | 9 | 12 | 7 | 3 | 10 | 11 |
| Melt viscosity (Pa · s) of resin material | 130 | 150 | 110 | 150 | 180 | 190 | 140 | 130 | 130 | 130 | 110 | 130 |

TABLE 7

| | Reference examples | | | | Comparative examples | |
|---|---|---|---|---|---|---|
| | A3 | A4 | A5 | A6 | A1 | A2 |
| Manufacturing step | (1) | (2) | (1) | (1) | (1) | Resin-only bearing |
| Ingot metal plate | E | E | E | A | E | — |

TABLE 7-continued

|  | Reference examples | | | | Comparative examples | |
| --- | --- | --- | --- | --- | --- | --- |
|  | A3 | A4 | A5 | A6 | A1 | A2 |
| Resin layer | h | i | j | k | a | — |
| Resin layer thickness (mm) | 0.4 | 0.4 | 0.4 | 0.4 | 1 | — |
| Resin layer peeling | none | none | none | none | none | — |
| Seizing time (minutes) | 10 | 25 | 29 | 40 | <1 | Not measureable |
| Abrasion amount (μm) | 25 | 34 | 55 | 130 | 75 | Abnormal abrasion |
| Melt viscosity (Pa·s) of resin material | 230 | 110 | 140 | 135 | 130 | — |

In particular, examples A10 to A16 and A19, which had aluminum alloy or copper alloy as the ingot metal plate, had a seizing time of 50 minutes or longer, an abrasion amount of 10 μm or less, and seizing resistance and abrasion resistance were excellent, as shown in Table 6.

As shown in Table 7, the conventional bearing (resin-only bearing) of comparative example A2 has abnormal abrasion within 30 minutes and the seizing resistance test could not be performed. Also, the composite plain bearing which had a thickness in excess of 0.7 mm (comparative example A1) had a seizing time of less than one minute, and the abrasion amount was very considerable.

Examples of the cradle guide of the present invention are described below.

The starting materials of the resin layers used in the examples and comparative examples are described below. The melt viscosities of the aromatic polyether ketone resins are values measured using a capillograph manufactured by Toyo Seiki Seisaku-sho, Ltd. in a ϕ1 mm×10 mm capillary at a resin temperature of 380° C. and a shear rate of 1000 s$^{-1}$.
(1) Aromatic PEK resin (PEK): PEEK 90P (melt viscosity: 105 Pa·s) manufactured by Victrex plc.
(2) PTFE resin (PTFE1): KTL-610 (Recycled PTFE) manufactured by Kitamura, Ltd.
(3) PAN carbon fiber (CF1): Besfight HT-100 (fiber length: 0.04 mm; fiber diameter: 7 μm) manufactured by Toho Tenax.
(4) PTFE resin (PTFE2): PTFE-31JR manufactured by Du Pont-Mitsui Fluorochemicals Co., Ltd.
(5) Pitch carbon fiber (CF2): M-101S (fiber length: 0.12 mm; fiber diameter: 14.5 μm) manufactured by Kureha Corp.
(6) Calcium sulfate powder (CaSO$_4$): D-101A (average particle diameter: 24 μm) manufactured by Noritake Co., Ltd.
(7) Molybdenum disulfide (MoS$_2$): Molykote Z manufactured by Dow Corning Toray Co., Ltd.
(8) Polyamide imide resin (PAI): manufactured by Daikin Industries, Ltd.
(9) Graphite (GRP): TIMREX KS6 (average particle diameter: 6 μm) manufactured by Timcal Japan The starting materials (a, b) of the resin layer for the example shown in Table 8 were dry blended using a Henschel dry mixer using the blend ratios (vol %) shown in Table 8, and the mixture was melt-kneaded using a twin-screw extruder to fabricate pellets for injection molding.

TABLE 8

| Starting material | Resin composition | | | |
| --- | --- | --- | --- | --- |
|  | a | b | c | d |
| (1) PEK | 80 | 70 | — | — |
| (2) PTFE1 | 10 | 20 | — | 42 |
| (3) CF1 | 10 | 10 | — | — |
| (4) PTFE2 | — | — | 85 | — |
| (5) CF2 | — | — | 5 | — |
| (6) CaSO$_4$ | — | — | 5 | — |
| (7) MoS$_2$ | — | — | 5 | — |
| (8) PAI | — | — | — | 53 |
| (9) GRP | — | — | — | 5 |

Examples B1 to B4

An ingot metal plate (press punched, ϕ18 mm×2 m) made of SPCC was used as the ingot metal member. The pretreatments shown in Table 9 were carried out on the face ingot metal plate to be joined with the resin layer. The "acid solution treatment" in Table 9 was carried out by immersing the ingot metal plate in an aqueous solution of 20% nitric acid at room temperature (about 20 to 30° C.) for 30 seconds to one minute. Degreasing was carried out prior to treatment, and washing and drying were carried out after the treatment. "Sintered metal layer" in Table 9 entailed plating copper over the entire surface of the ingot metal plate, thereafter dispersing a bronze powder (Cu—Sn) on the plate surface, and heating and pressurizing the metal plate having the uniformly dispersed bronze powder to thereby form a sintered metal layer.

A resin layer was insert molded using these pellets to a thickness of 0.5 mm on this surface to fabricate test pieces as cradle guides. The resin temperature was 380° C. to 400° C., and the mold temperature was 180° C. When insert molding was carried out, the melt flow direction of the resin layer was made to be at a right angle to the direction of motion of the test pieces.

Comparative Example B1

A ingot metal plate provided with the same sintered metal layer as example B1 was used, a dispersion of the resin composition adjusted to the blend ratio (vol %) shown in c of Table 8 was coated onto the sintered metal layer, the solvent was evaporated in a drying oven, and the resin composition components were impregnated in and coated on the ingot metal plate by heating and pressurization to fabricate a test piece.

Comparative Example B2

A ingot metal plate provided with the same sintered metal layer as example B1 was used, a coating agent of the resin composition adjusted to the blend ratio (vol %) shown in d of Table 8 was used to form a lubricating film and fabricate a test piece.

Using the resulting test pieces and counterpart materials made of an aluminum alloy, a reciprocating movement test was carried out under the following conditions while the test pieces and counterpart materials were made to slide. The results are shown in Table 9.

Test Conditions

Tester: Reciprocating movement tester manufactured by NTN
Surface pressure: 100 MPa
Maximum vibration speed: 2.95 m/min
Amplitude: ±50 mm
Temperature: Room temperature (25° C.)
Lubrication condition: Oil lubricated
Test time: 10,000 cycles (the coefficient of friction was measured at the start, 500 cycles, and 2000 cycles)

TABLE 9

| | | Test piece configuration | | Coefficient of friction | | | |
|---|---|---|---|---|---|---|---|
| | | Resin composition | Joining face treatment | Start | 500 cycles | 2000 cycles | 10000 cycles |
| Examples | B1 | a | Sintered metal layer | 0.07 | 0.05 | 0.04 | 0.04 |
| | B2 | a | Acid solution treatment | 0.06 | 0.05 | 0.04 | 0.05 |
| | B3 | b | Sintered metal layer | 0.06 | 0.05 | 0.05 | 0.05 |
| | B4 | b | Acid solution treatment | 0.07 | 0.06 | 0.04 | 0.05 |
| Comparative examples | B1 | c | Sintered metal layer | 0.06 | 0.18 | — | — |
| | B2 | d | Sintered metal layer | 0.06 | 0.19 | — | — |

It is apparent from Table 9 that in comparative examples B1, B2, the coefficient of friction at 500 cycles was high, continuous testing was not possible, and the comparative examples were considered to be unable to withstand long-term use. In contrast, examples B1 to B4 had a low coefficient of friction until the end of the reciprocating test. Also, no changes were found in the state of the film by visual observation. The cradle guides of the examples were thereby considered to be capable of withstanding long-term use in a variable capacity piston pump, and were confirmed to satisfy all requirements of load resistance, abrasion resistance, and low-friction characteristics.

Examples of the sliding nut (in which the nut main body is an ingot metal) of the present invention are described below.

Examples C1 to C16, Comparative Examples C1 to C3, and Reference Examples C1 to C7

Table 10 shows a summary of the materials and surface treatments of the ingot metal nut main body used in these examples, comparative examples, and reference examples. In Table 10, the acid treatment (nitric acid) was carried out by immersing the test piece in an aqueous solution of 20% nitric acid at room temperature (about 20 to 30° C.) for 30 seconds to one minute. The acid treatment (sulfuric acid) was carried out by immersing the test piece in an aqueous solution of 24% sulfuric acid at room temperature (about 20 to 30° C.) for 30 seconds to one minute. The AMALPHA treatment was carried out by immersion for one to five minutes at room temperature (about 20 to 30° C.). NMT treatment was carried out by immersion for five minutes at a temperature of 75° C. TRI treatment was carried out by immersion and energizing for one to ten minutes at a temperature of 60° C. Degrease cleansing was carried out prior to these treatments, and washing and drying were carried out after the treatments.

TABLE 10

| | Specifications | | |
|---|---|---|---|
| Ingot metal plate | Material (numbers in parentheses indicate thermal conductivity [W/m · K]) | | Chemical surface treatment |
| A | Carbon steel for mechanical structures | S45C (44) | Acid treatment (nitric acid) |

TABLE 10-continued

| | Specifications | | |
|---|---|---|---|
| Ingot metal plate | Material (numbers in parentheses indicate thermal conductivity [W/m · K]) | | Chemical surface treatment |
| B | Stainless steel | SUS303 (17) | Acid treatment (sulfuric acid) |
| C | Aluminum alloy | A5056 (110) | Toa Denka KK TRI treatment |
| D | Aluminum alloy | A5056 (110) | MEC Co., Ltd. AMALPHA treatment |
| E | Aluminum alloy die cast | ADC12 (96) | Taiseiplas Co., Ltd. NMT treatment |
| F | Copper alloy | C3604 (117) | Toa Denka KK TRI treatment |
| G | Copper alloy | C3604 (117) | MEC Co., Ltd. AMALPHA treatment |
| H | Aluminum alloy | A5056 (110) | None |
| I | Copper alloy | C3604 (117) | None |

The starting materials of the resin layer used in these examples, comparative examples, and reference examples are summarized below. These starting materials were dry-blended using a Henschel dry mixer in the blend ratios (vol %) shown in Tables 11 and 12, and the mixture was melt-kneaded using a twin-screw extruder to fabricate pellets.

(1) Aromatic PEK resin (PEK): PEEK 150P manufactured by Victrex plc.
(2) Thermoplastic PI resin (PI): Aurum PD450 manufactured by Mitsui Chemicals, Inc.
(3) PPS resin (PPS): Susteel B063 manufactured by Tosoh Corp.

(4) PTFE resin (PTFE): KTL-610 (Recycled PTFE) manufactured by Kitamura, Ltd.
(5) Graphite (GRP): TIMREX KS6 (scaly) manufactured by Timcal Japan
(6) Pitch carbon fiber (CF): KRECA M-101S (average fiber length: 100 μm; average fiber diameter: 14.5 μm) manufactured by Kureha Corp.
(7) Glass fiber (GF): MF06JB1-20 (average fiber length: 30 to 100 μm; average fiber diameter: 10 μm) manufactured by Asahi Fiber Glass Co., Ltd.

TABLE 11

| Starting | Resin composition | | | | | | |
|---|---|---|---|---|---|---|---|
| material | a | b | c | d | e | f | g |
| (1) PEK | 70 | — | — | — | — | — | — |
| (2) PI | — | 70 | — | — | — | — | — |
| (3) PPS | — | — | 70 | 75 | 68 | 60 | 85 |
| (4) PTFE | 25 | 25 | 25 | 25 | 30 | 30 | 10 |
| (5) GRP | 5 | 5 | 5 | — | 2 | 10 | 5 |

TABLE 12

| Starting | Resin composition | | |
|---|---|---|---|
| material | h | i | j |
| (3) PPS | 75 | 80 | 80 |
| (5) GRP | 25 | — | — |
| (6) CF | — | 20 | — |
| (7) GF | — | — | 20 |

(1) Shearing Close-adhesive Strength Test

A resin layer was insert molded to a thickness of 1 mm using the pellets of the resin compositions a to c in Table 11 on the inside diameter part (straight) of cylindrical bodies (φ12×φ18×25 mm) composed of the ingot metal materials in Table 10 to manufacture test pieces for a sharing close-adhesive strength test. The ingot metal members were machined to fabricate the cylindrical bodies, and the entire surface thereof were subjected to the surface treatments shown in Table 10 (excluding metals H, I). The shearing close-adhesive strength test was carried out by fixing test cylindrical bodies in place, applying shearing force to the inside diameter resin layer in the axial direction, and measuring the load required to peel the resin layer away from the test cylindrical bodies. The values obtained by dividing these loads by the apparent joining surface area of the resin layer and the inside diameter part of the test cylindrical bodies were used as the shearing close-adhesive strength. Also, the surface roughness Ra in Table 13 is the surface roughness after surface treatment (excluding metals H, I) of the face joined to the resin layer on the cylindrical bodies.

TABLE 13

| | | Specifications of ingot metal | | | | Shearing |
|---|---|---|---|---|---|---|
| | | Metal | Material | Chemical surface treatment | Surface roughness Ra | Resin composition | close-adhesive strength MPa |
| Examples | C1 | A | S45C | Acid treatment | 4.2 μm | b | 5.1 |
| | C2 | B | SUS303 | Acid treatment | 3.4 μm | c | 3.5 |
| | C3 | C | A5056 | TRI treatment | 0.1 μm | c | 4.4 |
| | C4 | D | A5056 | AMALPHA treatment | 5.2 μm | c | 4.0 |
| | C5 | E | ADC 12 | NMT treatment | 0.8 μm | a | 3.9 |
| | C6 | F | C3604 | TRI treatment | 0.1 μm | c | 4.5 |
| | C7 | G | C3604 | AMALPHA treatment | 3.9 μm | c | 6.4 |
| Reference examples | C1 | H | A5056 | None | 0.1 μm | c | 1.0 |
| | C2 | I | C3604 | None | 0.1 μm | c | 0.9 |

As shown in Table 13, examples C1 to C7 have a shearing close-adhesive strength of 2 MPa or greater between the cylindrical bodies and the resin layer, sufficient close-adhesive strength against frictional force during use was obtained.

(2) Static Fracture Test

Figure 17:
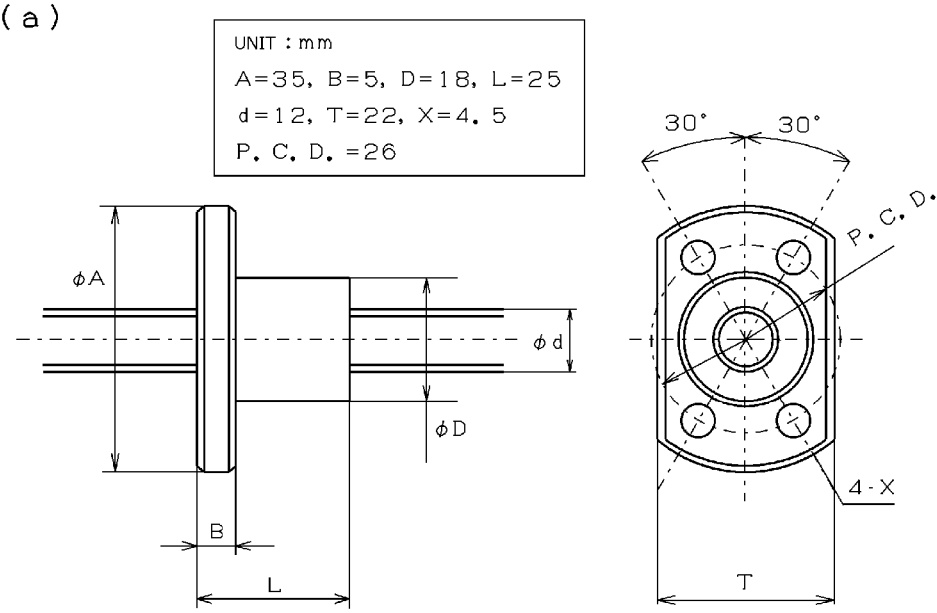
FIG. 17 is a view showing the nut test piece of the examples and elsewhere.
Figure 17:
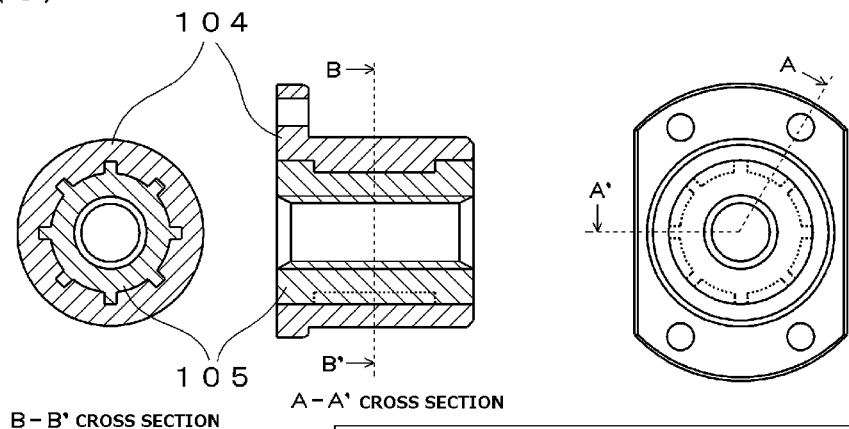

Examples C8 to C10 were obtained by insert molding a resin layer using pellets of the resin compositions on the inside diameter part (female threading) of the nut main body for nut test pieces composed of the ingot metal materials in the combinations shown in Table 14, and the resin was thereafter machined along the female threading of the nut main body to fabricate nut test pieces (see FIG. 17(a)) having a resin layer thickness of 0.3 mm. The threading was a single thread having a gothic-arc shape with a lead of 2 mm. The shape and dimensions of the nut test pieces excluding the resin layer are as shown in FIG. 17(a). The static fracture test was carried out by fixing the nut test pieces in place with a screw shaft passed through the inside diameter of the nut test piece, and measuring the fracture load when a load is applied to the screw shaft in the axial direction. The results are shown in Table 14.

The resin nut (no ingot metal) of comparative example C1 was given the shape and dimensions shown in FIG. 17(a) by injection molding and machining using the pellets of resin composition c in Table 11. The nut composed of an ingot metal and resin of comparative example C2 was obtained by injection molding using stainless steel (SUS303) as the external peripheral part 104 (having a detent and retainer on the inside diameter) of the nut and the resin composition c as the internal peripheral part 105, which includes a female threading part, as shown in FIG. 17(b). The resin thickness (largest part) of the inside diameter part was 10 mm, and the threading was single thread having a gothic-arc shape with a lead of 2 mm. The other dimensions of the nut test piece are as shown in FIG. 17(b). The same static fracture test as used for example C8 was carried out for the nut test pieces of comparative examples C1 and C2, and the fracture load was measured. The results are shown in Table 14.

TABLE 14

| | | Specifications of ingot metal | | Resin composition | Static fracture load, kN |
|---|---|---|---|---|---|
| | | Metal Material | Chemical surface treatment | | |
| Examples | C8 | B SUS303 | Acid treatment | c | 33 (Thread ridge fracture) |
| | C9 | C A5056 | TRI treatment | c | 28 (Thread ridge fracture) |
| | C10 | G C3604 | AMALPHA treatment | c | 30 (Thread ridge fracture) |
| Comparative examples | C1 | Resin nut | | c | 1.8 (Flange fracture) |
| | C2 | Nut composed of ingot metal and resin | | c | 7 (Fracture of metal and resin joining part) |

Examples C8 to C10 had a high static fracture load of 28 kN or greater, as shown in FIG. 14. The resin-only nut of comparative example C1 has a very low static fracture load, and even the nut of comparative example C2 composed of an ingot metal and resin had a static fracture load about ¼ that of the examples. In comparative example C2, the outside diameter of the nut is very large in order in increase the fracture load, and a compact design having the same dimensions as the examples would be difficult, and when the dimensions are reduced, the fracture load would be reduced.

(3) Abrasion Test

Examples C8 to C16 and reference examples C3 to C7 were obtained by insert molding a resin layer using the pellets of the resin compositions on the inside diameter part (female threading) of the nut main body for nut test pieces composed of the ingot metal materials in the combinations shown in Tables 16 and 17, and the resin was thereafter machined along the female threading of the nut main body to fabricate nut test pieces (see FIG. 17(a)) having a resin layer thickness of 0.3 mm. The threading was a single thread having a gothic-arc shape with a lead of 2 mm. The shape and dimensions of the nut test pieces excluding the resin layer are as shown in FIG. 17(a). The nut test pieces of examples C8 to C10 had the same configuration as the test pieces (examples C8 to C10) used in the static fracture test. The abrasion test was carried out using these nut test pieces in the test conditions of Table 15, and the abrasion amount (amount of increase in the axial gap) was measured after testing. The results are shown in Tables 16 and 17. A load of 1.2 kN converted to surface pressure of the contact part of the thread ridge is 7 MPa.

Comparative examples C1 and C2 had the same configuration as the test pieces (comparative examples C1 and C2) used in the static fracture test. Comparative examples C3 was obtained using a powder coating to form a resin layer composed of a thermosetting polyimide resin (blended with 15% graphite) on the inside diameter part (female threading) of the nut main body for nut test pieces machined from an ingot metal material (SUS303), and thereafter machining the resin along the female threading of the nut main body to fabricate nut test pieces having a resin layer thickness of 0.3 mm. The same abrasion test as used for example C8 was carried out using the nut test pieces of these comparative examples, and the abrasion amount (amount of increase in the axial gap) was measured after testing. The results are shown in Table 18.

TABLE 15

| | |
|---|---|
| Rotational speed | 100 rpm |
| Load | 1.2 kN |
| Stroke | 180 mm |
| Cycles | 2000 |
| Lubrication | No lubrication |
| Counterpart screw shaft (rolled thread) | SUS304 - Surface roughness Ra of the contact surface with the sliding nut: 0.03 μm Ra |

TABLE 16

| | Examples | | | | | | | | |
|---|---|---|---|---|---|---|---|---|---|
| | C8 | C9 | C10 | C11 | C12 | C13 | C14 | C15 | C16 |
| Ingot metal | B | C | G | C | C | C | C | C | C |
| Resin composition | c | c | c | a | b | d | e | f | g |
| Amount of abrasion mm | 0.09 | 0.07 | 0.06 | 0.06 | 0.06 | 0.09 | 0.08 | 0.06 | 0.09 |

TABLE 17

| | Reference examples | | | | |
|---|---|---|---|---|---|
| | C3 | C4 | C5 | C6 | C7 |
| Ingot metal | H | I | C | C | C |
| Resin composition | c | c | h | i | j |
| Amount of abrasion mm | Resin layer peeled away during test | Resin layer peeled away during test | 0.16 | 0.20 (Abnormal sound) | 0.22 (Abnormal sound) |

TABLE 18

| | Comparative examples | | |
|---|---|---|---|
| | C1 | C2 | C3 |
| Ingot metal | Resin nut | Nut composed of ingot metal and resin | Powder-coated nut |
| Resin composition | C | C | — |
| Amount of abrasion mm | Flange fractured during test | 0.25 | 0.21 |

As shown in Table 16, examples C8 to C16 in which the ingot metal nut main body was subjected to a surface treatment did not fracture and the resin layer did not peel away during testing, and the abrasion amount was less than 0.1 mm. Among the nut main bodies, abrasion resistance was excellent for the aluminum alloy (example C9) and the copper alloy (example C10), which had a higher thermal conductivity than the stainless steel (example C8).

As shown in Table 18, the flange of the resin-only nut of comparative example C1 fractured during testing and the abrasion test could not be performed. The nut of comparative example C2 composed of an ingot metal and a resin had a large amount of abrasion. Although a resin layer was provided to the ingot metal nut main body, the nut of comparative example C3, which was a thermosetting polyimide resin powder-coated with a resin layer, had inferior abrasion resistance.

Described below are examples of the sliding nut (in which the nut main body is a sintered metal) of the present invention.

A sintered metal having a density of 6.2 g/cm$^3$ (theoretical density ratio of the base material: 0.79) and mainly composed of iron was used as the main body material in the evaluation test. Used as the material of the resin layer was a resin composition in which 25 wt % (20.6 vol %) of a PTFE resin (KTL610 manufactured by Kitamura, Ltd.) and 5 wt % (3.9 vol %) of a scaly graphite (TIMREX KS6 manufactured by Timcal Japan) were blended with a PPS resin (Susteel B063 manufactured by Tosoh Corp.).

A sintered metal material composed of the main body material was machined to form a cylindrical body (φ12× φ18×25 mm), and a sample (sample for example) treated over the entire surface of the cylindrical body by NMT treatment manufactured by Taiseiplas Co., Ltd and an untreated sample (sample for comparative example). were manufactured. Next, a resin layer was insert molded to a thickness of 1 mm on the inside diameter part (straight) of the cylindrical bodies using the pellets of the resin composition described above to fabricate shearing close-adhesive strength test pieces.

The shearing close-adhesive strength test was carried out by fixing the cylindrical test pieces in place, applying shearing force in the axial direction to the inside diameter resin layer, and measuring the load for peeling the resin layer away from the cylindrical test pieces. The value obtained by dividing the breaking load by the apparent joining surface area between the resin layer and the inside diameter part of the cylindrical test piece was used as the shearing close-adhesive strength.

As a result of the shearing close-adhesive strength test, the shearing close-adhesive strength of the example was 6.7 MPa, the shearing close-adhesive strength of the comparative example was 3.2 MPa, and the example which underwent a chemical surface treatment on the face joined to the resin layer had a shearing close-adhesive strength that was twice or more of that of the untreated comparative example.

INDUSTRIAL APPLICABILITY

The composite plain bearing of the present invention has excellent heat resistance, creep resistance under high surface pressure, low friction, abrasion resistance, and other characteristics while being capable of manufacture with high productivity, and can therefore be advantageously used as a replacement for a conventional plain bearing, roller bearing, and thrust needle bearing used in a compressor for a room air-conditioner or car air-conditioner, in a transmission in an automobile, construction machinery, or the like, in hydraulic machinery and the like, or as a hinge in a reclining seat in an automobile or the like.

The cradle guide of the present invention is capable of satisfying all requirements of load resistance, abrasion resistance, and low-friction characteristics, and can therefore be advantageously used in a variable capacity axial piston pump used in a hydraulic pump, hydraulic motor, or the like, which are provided as a hydraulic source in a hydraulic excavator or other construction machinery, and in general industrial machinery.

The sliding screw device provided with the sliding nut of the present invention has excellent seizing resistance, abrasion resistance, and other sliding characteristics, even under high-load conditions, and can therefore be advantageously used as a sliding screw device used in high-load, high-temperature conditions in industrial machinery.

EXPLANATION OF REFERENCE SYMBOLS AND NUMERALS

1, 1', 1", 1a, 1b Composite plain bearing (radial plain bearing)
2 Ingot metal plate
3 Resin layer
4 Physical securing part
5, 5', 5" Compressor
6 Cylinder block
7 Front housing
8 Valve-forming body
9 Rear housing
10 Crank chamber
11 Drive shaft
12 Lug plate
13 Swash plate
14 Hinge mechanism
15 Cylinder bore
16 Piston
17 Shoe
18a, 18b Thrust roller bearing
19 Intake chamber
20 Discharge chamber
21 Thrust plain bearing (composite plain bearing)
24 Plate
31a, 31b Radial plain bearing (composite plain bearing)
32 Drive shaft
33 Cylinder block
33a Cylinder bore
33b Accommodation hole
34 Front housing
34a Through-hole
34b Lip seal
35 Rear housing
36 Swash plate 37 Crank chamber
38 Shoe
39 Piston
40 Valve-forming body
41 Intake chamber
42 Discharge chamber
43 Bolt through-hole
44 Thrust rolling bearing
45 Fixed scroll
51a Fixed substrate
51b Fixed spiral wall
52 Center housing
52a Partition part
52b Through-hole
53 Motor housing
53a Outlet
54 Shaft
54a Eccentric shaft
54b, 54c Fluid passage
55, 56, 59 Radial plain bearing (composite plain bearing)
57 Balance weight
58 Moveable scroll
58a Moveable base plate
58b Movable spiral wall
58c Boss part
58d Discharge port
60 Bushing
61 Sealed chamber
62 Stator
63 Rotor
64 Discharge chamber
65 Motor chamber
66 Seal member
67 Low-pressure chamber
68 Space
81 Cradle guide
81a Cradle guide main body
81b Bushing
81c Ingot metal member
81d Resin layer
81e, 81f Support face
81g Concave part
81h Convex part
82 Piston
83 Cradle
84 Fibrous filler
85, 86 Housing
87 Rotating shaft
88 Cylinder block
88a Piston accommodation chamber
89 Valve plate
89a Intake port
89b Discharge port
90, 93 Pressing spring
91 Retainer
92 Shoe
94 Hydraulic pressure control device
95 Cylinder
101 Sliding screw device
102 Screw shaft
103 Sliding nut
103a Nut main body
103b Resin layer
104 External peripheral part of the nut (ingot metal)
105 Internal peripheral part of the nut (resin)

The invention claimed is:

1. A sliding nut that moves while axially sliding on a screw shaft in accompaniment with the rotation of the screw shaft in a sliding screw device, comprising a nut main body which comprises an ingot metal, wherein a resin layer of a resin composition in which a synthetic resin is used as a base resin is overlaid by injection molding as a threading groove part on a surface of a female threading part into which the screw shaft threadedly engages in the nut main body,
   a joining face of the nut main body having a joining film that chemically reacts with a resin layer on said joining face or a joining face of the nut body is provided with very small concavo-convex shapes,
   said female threading part is a portion of said nut main body and is formed in an inside diameter part of said nut main body,
   said resin layer, which is said threading groove part, is formed so as to cover said surface of said female threading part and
   said resin layer, which is said threading groove part, makes sliding contact directly with said screw shaft.

2. The sliding nut of claim 1, characterized in that the synthetic resin is at least one selected from an aromatic polyether ketone resin, a thermoplastic polyimide resin, and a polyphenylene sulfide resin.

3. The sliding nut of claim 2, characterized in that the resin composition contains 10 to 30 vol % of polytetrafluoroethylene resin and 2 to 10 vol % of graphite with respect to the entire resin composition without including a fibrous filler.

4. The sliding nut of claim 1, characterized in that the thermal conductivity of the ingot metal of the nut main body is 50 W/(m·K) or more.

5. The sliding nut of claim 1, characterized in that the ingot metal of the nut main body is aluminum, an aluminum alloy, copper, or a copper alloy.

6. A sliding nut that moves while axially sliding on a screw shaft in accompaniment with the rotation of the screw shaft in a sliding screw device, comprising a nut main body which comprises a sintered metal, wherein resin layer of a resin composition in which a synthetic resin is used as a base resin is overlaid by injection molding as a threading groove part on a surface of a female threading part into which the screw shaft threadedly engages in the nut main body,
   a joining face of the nut main body having a joining film that chemically reacts with a resin layer on said joining face or a joining face of the nut body is provided with very small concavo-convex shapes,
   said female threading part is a portion of said nut main body and is formed in an inside diameter part of said nut main body,
   said resin layer, which is said threading groove part, is formed so as to cover said surface of said female threading part and
   said resin layer, which is said threading groove part, makes sliding contact directly with said screw shaft.

7. A sliding screw device provided with a screw shaft and a sliding nut that moves while axially sliding on the screw shaft in accompaniment with the rotation of the screw shaft, the sliding screw device being characterized in that the sliding nut is the sliding nut of claim 1.

8. The sliding screw device of claim 7, characterized in that the inside diameter of the smallest part of the nut main body is less than the outside diameter of the largest part of the screw shaft.

9. A sliding screw device provided with a screw shaft and a sliding nut that moves while axially sliding on the screw shaft in accompaniment with the rotation of the screw shaft, the sliding screw device being characterized in that the sliding nut is the sliding nut of claim 6.

10. The sliding nut of claim 1, characterized in that the thickness of the resin layer is 0.1 to 1.5 mm.

11. The sliding nut of claim 6, characterized in that the thickness of the resin layer is 0.1 to 1.5 mm.

* * * * *